(12) United States Patent
Jiang et al.

(10) Patent No.: US 12,725,403 B2
(45) Date of Patent: Sep. 1, 2026

(54) IMAGE PROCESSING METHOD AND RELATED APPARATUS

(71) Applicant: TENCENT TECHNOLOGY (SHENZHEN) COMPANY LIMITED, Shenzhen (CN)

(72) Inventors: Xinghua Jiang, Shenzhen (CN); Hao Liu, Shenzhen (CN); Xin Li, Shenzhen (CN); Deqiang Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 250 days.

(21) Appl. No.: 18/594,113

(22) Filed: Mar. 4, 2024

(65) Prior Publication Data

US 2024/0249503 A1 Jul. 25, 2024

Related U.S. Application Data

(63) Continuation of application No. PCT/CN2023/108785, filed on Jul. 24, 2023.

(30) Foreign Application Priority Data

Sep. 26, 2022 (CN) ......................... 202211173745.9

(51) Int. Cl.
*G06V 10/764* (2022.01)
*G06V 10/26* (2022.01)
(Continued)

(52) U.S. Cl.
CPC ............ *G06V 10/764* (2022.01); *G06V 10/26* (2022.01); *G06V 10/42* (2022.01); *G06V 10/44* (2022.01);
(Continued)

(58) Field of Classification Search
None
See application file for complete search history.

(56) References Cited

U.S. PATENT DOCUMENTS

| | | | |
|---|---|---|---|
| 10,552,664 B2 | 2/2020 | Asif et al. | |
| 2024/0037911 A1* | 2/2024 | Xin ...................... | G06V 10/806 |

FOREIGN PATENT DOCUMENTS

| | | |
|---|---|---|
| CN | 109359696 A | 2/2019 |
| CN | 112699855 A | 4/2021 |
| CN | 112784856 A | 5/2021 |

OTHER PUBLICATIONS

Dai, et al, "CoAtNet: Marrying Convolution and Attention for All Data Sizes", CV, Sep. 2021, pp. 1-18 (Year: 2021).*
(Continued)

*Primary Examiner* — Edward Park
(74) *Attorney, Agent, or Firm* — Anova Law Group, PLLC

(57) ABSTRACT

Disclosed in this application is an image processing method and a related apparatus. The method includes performing vectorization on a to-be-processed image, to obtain an image representation vector; performing feature mapping on the image representation vector to obtain an image feature, including: performing, at a same network layer of a network block, global feature mapping on input content to obtain a global feature, and performing local feature mapping on the input content to obtain a local feature, the input content being obtained based on the image representation vector; performing feature fusion on the global feature and the local feature to obtain a fused feature; obtaining an image feature based on the fused feature; and performing category prediction by using a classification module in the image classification model based on the image feature, to obtain a classification result of the to-be-processed image.

20 Claims, 16 Drawing Sheets

(51) Int. Cl.
*G06V 10/42* (2022.01)
*G06V 10/44* (2022.01)
*G06V 10/77* (2022.01)
*G06V 10/80* (2022.01)
*G06V 10/82* (2022.01)

(52) U.S. Cl.
CPC ........ *G06V 10/7715* (2022.01); *G06V 10/806* (2022.01); *G06V 10/82* (2022.01)

(56) References Cited

OTHER PUBLICATIONS

The European Patent Office (EPO) The Extended European Search Report for Application No. 23864104.7 Jan. 13, 2025, 2025 9 Pages.
Hao Liu et al. "Nommer: Nominate synergistic context in vision transformer for visual recognition." arxiv.org, Cornell University Library, 201 Olin Library Cornell University Ithaca, NY 14853, Nov. 25, 2021 (Nov. 25, 2021), XP091103973.
Jinpeng Li et al. "Local-to-global self-attention in vision transformers." arXiv preprint arXiv:2107.04735 (2021).
Youngwan Lee et al. "Mpvit: Multi-path vision transformer for dense prediction." Proceedings of the IEEE/CVF conference on computer vision and pattern recognition. 2022.
The World Intellectual Property Organization (WIPO) International Search Report for PCT/CN2023/108785 Sep. 19, 2023 6 Pages (including translation).
Eric Jang et al. "Categorical reparameterization with gumbel-softmax." arXiv preprint arXiv:1611.01144 (2016).
Vaswani Ashish et al. "Attention is all you need." Advances in neural information processing systems 30 (2017). 15 pages.

* cited by examiner

IMAGE PROCESSING METHOD AND RELATED APPARATUS

RELATED APPLICATIONS

This application is a continuation of PCT Application No. PCT/CN2023/108785, filed on Jul. 24, 2023, which claims priority to Chinese Patent Application No. 2022111737459, entitled "IMAGE PROCESSING METHOD AND RELATED APPARATUS" and filed with the China National Intellectual Property Administration on Sep. 26, 2022. The two applications are both incorporated herein by reference in their entirety.

FIELD OF THE TECHNOLOGY

This application relates to the field of artificial intelligence technologies, and in particular, to image processing technology.

BACKGROUND OF THE DISCLOSURE

With the development of technologies, artificial intelligence technologies are to be applied in more fields and play an increasingly important role. An important branch of artificial intelligence technologies is an image recognition technology, which can be used for classifying images. Image classification may include, for example, image content classification, recognizing text in an image, and identifying whether an image is compliant.

Currently, image feature learning is performed on a to-be-processed image by using a transformer-based solution, and then a classification result is determined based on a learned image feature.

However, if an object included in the to-be-processed image and an object included in another image have similar appearance features, it is difficult to accurately classify the to-be-processed image in the foregoing manner. In other words, for images with objects having similar appearance features, a classification capability is insufficient, and a classification effect is poor.

SUMMARY

To resolve the foregoing technical problems, this application provides an image processing method and a related apparatus, to accurately classify a to-be-processed image, thereby improving a classification capability and a classification effect.

In embodiments of this application, the following technical solutions are disclosed.

One aspect of this application provides an image processing method, performed by a computer device, the method including: performing vectorization on a to-be-processed image, to obtain an image representation vector; performing feature mapping on the image representation vector by using a network block comprised in a feature mapping module in an image classification model, to obtain an image feature, including: performing, at a same network layer of a network block, global feature mapping on input content by using the network layer to obtain a global feature, and performing local feature mapping on the input content by using the network layer to obtain a local feature, the input content being obtained based on the image representation vector; performing feature fusion on the global feature and the local feature by the network layer, to obtain a fused feature corresponding to the network layer; obtaining an image feature based on the fused feature corresponding to the network layer; and performing category prediction by using a classification module in the image classification model based on the image feature, to obtain a classification result of the to-be-processed image.

Another aspect of this application provides a computer device, including a processor and a memory, the memory being configured to store program code and transmit the program code to the processor; and the processor being configured to perform the method according to any one of the foregoing aspects according to instructions in the program code.

Another aspect of this application provides a non-transitory computer-readable storage medium, configured to store program code, the program code, when executed by a processor, causing the processor to perform the method according to any one of the foregoing aspects.

It may be seen from the foregoing technical solutions that when a to-be-processed image needs to be classified, vectorization may be performed on the to-be-processed image, to obtain an image representation vector of the to-be-processed image. Then feature mapping is performed on the image representation vector by using a network block included in a feature mapping module in an image classification model, to obtain an image feature of the to-be-processed image. When obtaining the image feature by using the network block, at a same network layer of a network block, global feature mapping and local feature mapping are performed, by using the network layer on input content obtained from the image representation vector, to obtain a global feature and a local feature, feature fusion is performed on the global feature and the local feature by using the network layer, to obtain a fused feature corresponding to the network layer, and the image feature is obtained based on the fused feature corresponding to the network layer. Because a plurality of features are fused in the same network layer to obtain the final image feature, the local feature and the global feature can be simultaneously learned, resolving a problem of neglecting the local feature in a transformer solution, and additionally improving the capability of fusion between the plurality of features. Accordingly, when category prediction is performed by using a classification module based on the image feature to obtain a classification result, because the local feature and the global feature are fused in the image feature, the to-be-processed image can be accurately classified, even for images with objects having similar appearance features, thereby improving the quality of classification.

DESCRIPTION OF EMBODIMENTS

The following describes embodiments of this application with reference to the accompanying drawings.

Image classification is about describing a category of image content. For example, if the image content is an elephant, a model or an algorithm needs to identify the image content as an elephant. In a broad sense, the image classification may include, for example, image content classification, recognizing text in an image, and identifying whether an image is compliant. The image content classification may be, for example, recognizing which category an object included in an image belongs to, and categories may include, for example, a bird, a ball, and a car. The recognizing text in an image may be, for example, recognizing what text is included in the image. In this case, each known text may be used as a category, to recognize which category the text included in the image belongs to, thereby recognizing what text is in the image. During identifying whether an image is compliant, a category may be, for example, compliant or non-compliant, to recognize which category the image belongs to.

Figure 1:
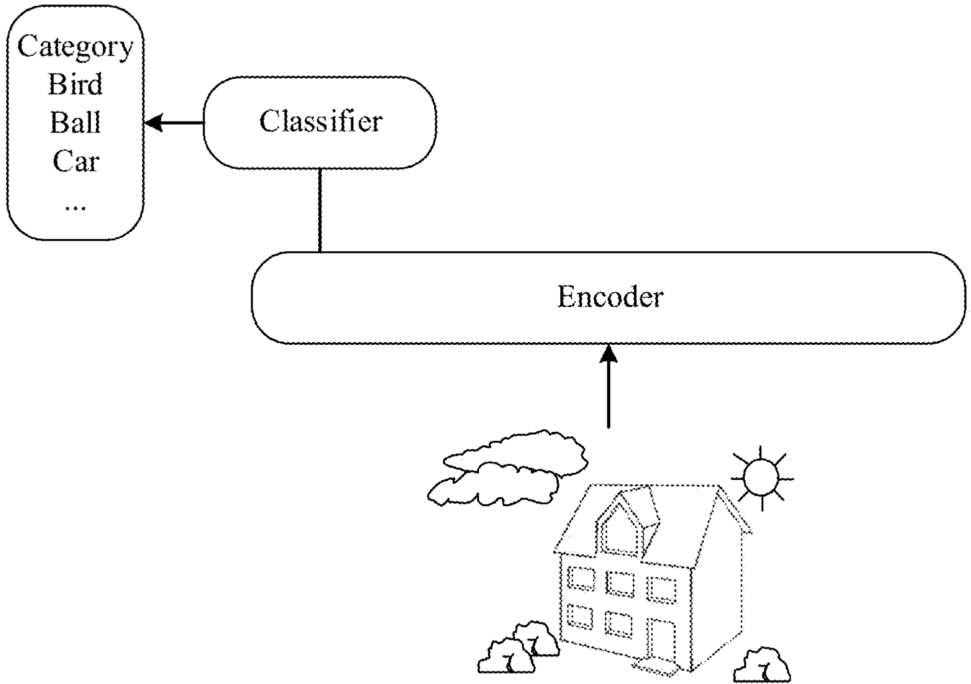
FIG. 1 is a framework diagram of an image processing method.

To classify an image, currently, image feature learning may be performed on a to-be-processed image by using a transformer-based solution, and then a classification result is determined based on a learned image feature. As shown in FIG. 1, a to-be-processed image is inputted to an encoder based on a transformer framework, which may be referred to as a transformer encoder. The transformer encoder may be a network layer including a plurality of self-attention mechanisms. Feature learning is performed on the to-be-processed image by using the transformer encoder, and a classification result is obtained based on a learned image feature through classification performed by a classifier. In FIG. 1, the classifier may be an MLP Head. The MLP Head is a layer structure for classification, and categories may include, for example, a bird, a ball, and a car. The classification result may be determined based on a probability value outputted on each category.

However, in the transformer solution, an image feature is generally learned through only a global self-attention method, and the method does not pay attention to learning of a local feature of an image. If an object included in the to-be-processed image and an object included in another image have similar appearance features, it is difficult to accurately classify the to-be-processed image in this method. In other words, for images with objects having similar appearance features, a classification capability is insufficient and a classification effect is poor in this method.

To resolve the foregoing technical problems, an embodiment of this application provides an image processing method. In the method, a plurality of features are fused at a same network layer to obtain a final image feature, so that a local feature and a global feature can be simultaneously learned, resolving a problem caused by paying no attention to the local feature in the transformer solution, additionally improving a capability of fusion between the plurality of features, and resolving a problem of unintelligent feature fusion in a hierarchical feature fusion solution. In this way, when prediction is performed by using a classification module based on the image feature to obtain a classification result, because the local feature and the global feature are fused in the image feature, the to-be-processed image can be accurately classified even for images with objects with similar appearance features, thereby improving the quality of classification.

The image processing method provided in embodiments consistent with the present disclosure is applicable to various image classification scenarios, including image content classification, recognizing text in an image, identifying whether an image is compliant, video classification (in this case, the to-be-processed image may be an image frame in a video, and a classification result of the video is obtained by processing the to-be-processed image), and the like.

The image processing method provided in embodiments consistent with the present disclosure may be performed by a computer device, and the computer device may be, for example, a server, or may be a terminal. The server may be an independent physical server, or may be a server cluster including a plurality of physical servers or a distributed system, or may further be a cloud server that provides a cloud computing service. The terminal includes, but not limited to, a smartphone, a computer, an intelligent voice interaction device, a smart home appliance, an in-vehicle terminal, an aircraft, and the like.

The method provided in embodiments consistent with the present disclosure may be applied to various scenarios such as a cloud technology, artificial intelligence, smart transportation, and assisted driving.

Figure 2:
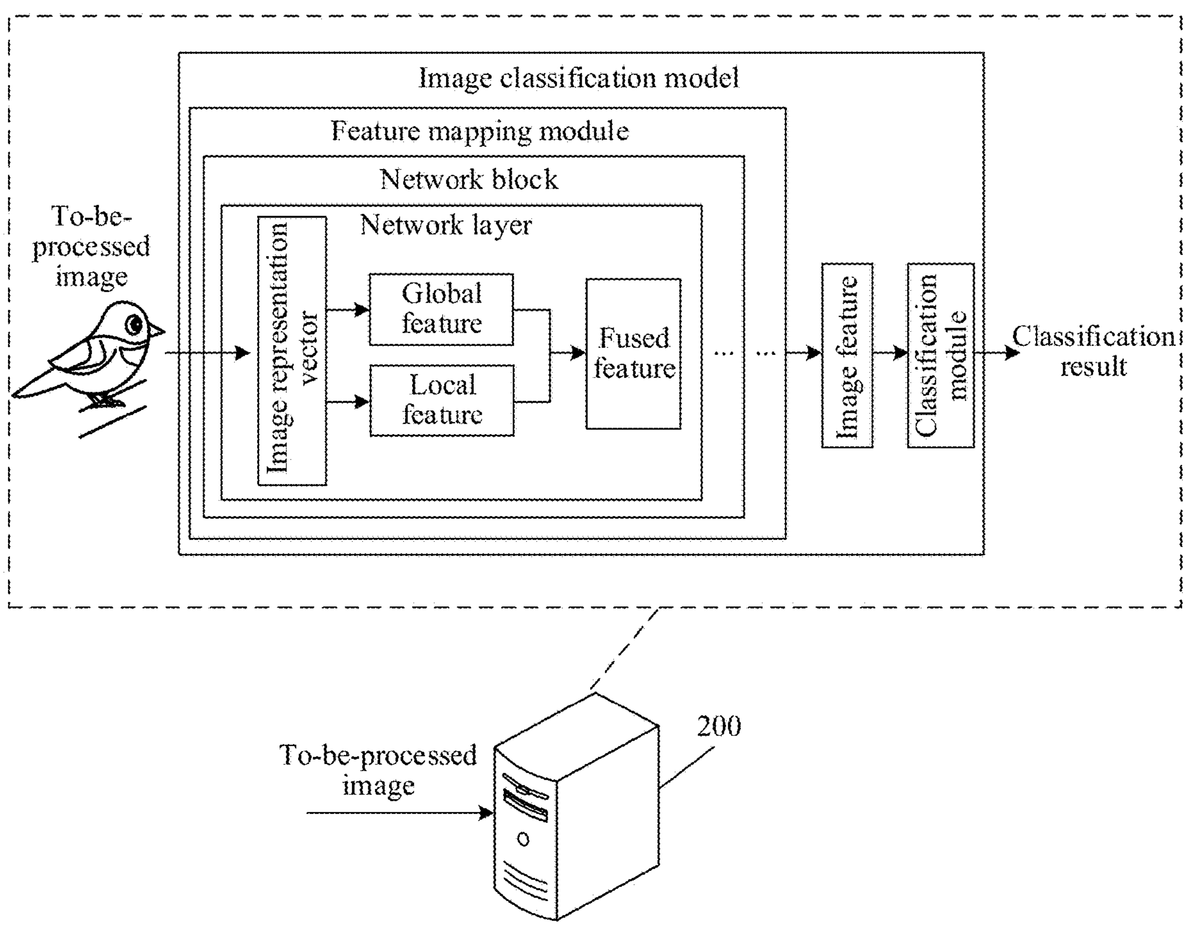
FIG. 2 is an architecture diagram of an application scenario of an image processing method according to an embodiment of this application.

FIG. 2 is an architecture diagram of an application scenario of an image processing method according to an embodiment of this application. The application scenario is described by using an example in which a server performs the image processing method provided in embodiments consistent with the present disclosure.

A server 200 may be included in the application scenario. When a to-be-processed image needs to be classified, the server 200 may obtain the to-be-processed image. The to-be-processed image is an image that needs to be classified, and the to-be-processed image may be a directly shot image, an existing image stored in the server 200, an image frame obtained by dividing a video into frames, or the like. An object may be included in the to-be-processed image, and the object may be various objects, animals, plants, text, and the like.

An image classification model may be run in the server 200, the image classification model may include a feature mapping module and a classification module, the feature mapping module includes a network block, and a network block includes a network layer. In this way, the server 200 may perform vectorization by using the image classification model based on the to-be-processed image, to obtain an image representation vector of the to-be-processed image, and then perform feature mapping on the image representation vector by using the network block, to obtain an image feature of the to-be-processed image.

In a process in which the server 200 obtains the image feature by using the network block, at a same network layer of a network block, the server 200 performs global feature mapping and local feature mapping, by using the network layer, on input content obtained based on the image representation vector, to obtain a global feature and a local feature, performs feature fusion on the global feature and the local feature by using the network layer, to obtain a fused feature corresponding to the network layer, and obtains the image feature based on the fused feature corresponding to the network layer. Because a plurality of features are fused at the same network layer to obtain the final image feature, the local feature and the global feature can be simultaneously learned, resolving a problem caused by paying no attention to the local feature in a transformer solution, and additionally improving a capability of fusion between the plurality of features.

Afterwards, the server 200 may perform prediction by using the classification module based on the image feature, to obtain a classification result. Because the local feature and the global feature are fused in the image feature, the to-be-processed image can be accurately classified even for images with objects having similar appearance features, thereby improving the quality of classification.

The method provided in embodiments consistent with the present disclosure mainly relates to computer vision (CV) and machine learning (ML) in the field of artificial intelligence.

Figure 3:
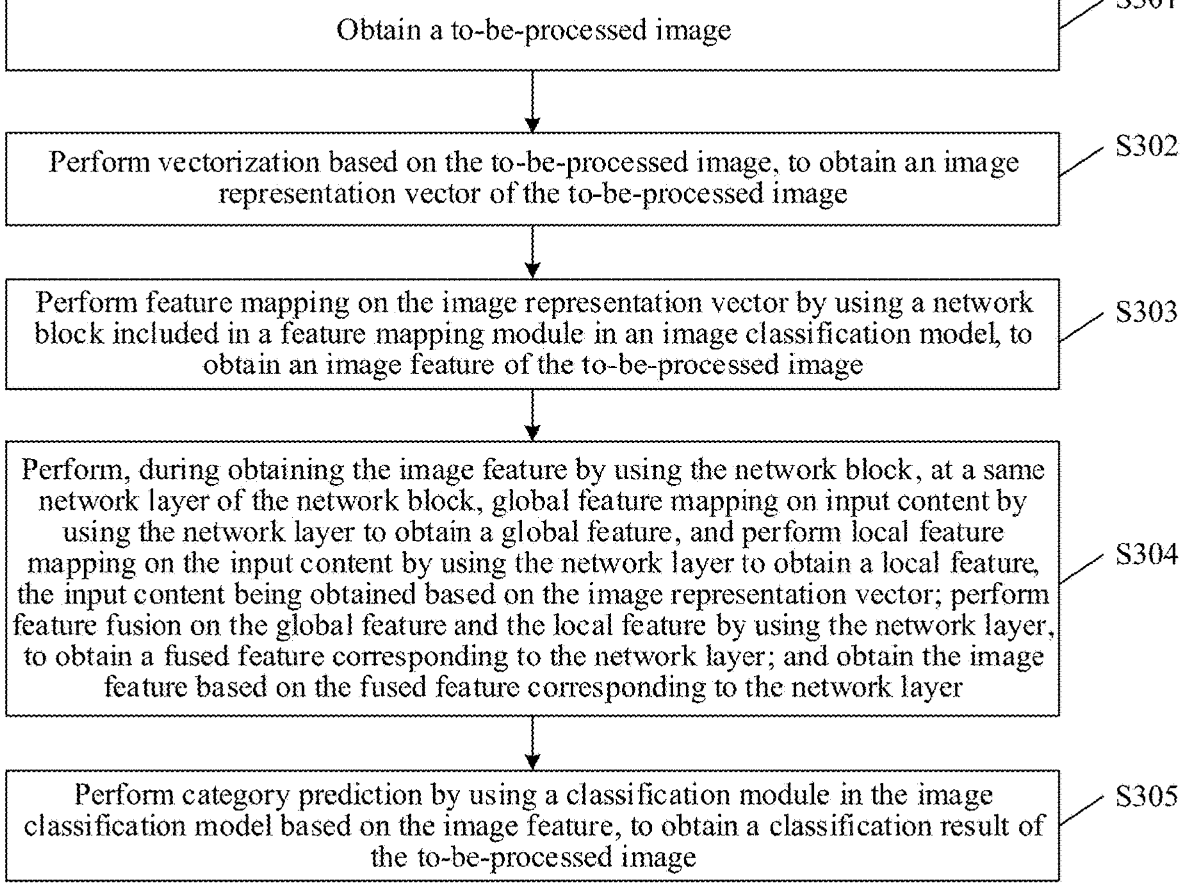
FIG. 3 is a flowchart of an image processing method according to an embodiment of this application.

Next, an image processing method provided in an embodiment of this application is described in detail with reference to the accompanying drawings by using an example in which a server performs the image processing method. FIG. 3 is a flowchart of an image processing method, and the method includes the following steps:

S301: Obtain a to-be-processed image.

When a specified image, for example, the to-be-processed image, needs to be classified, a server may obtain the to-be-processed image.

It may be understood that, in this embodiment, the to-be-processed image obtained by the server needs to be inputted to an image classification model, for ease of classifying the to-be-processed image. In a general case, the image inputted to the image classification model may be set to a preset resolution (for example, 224*224) based on different requirements of service content. In this case, the to-be-processed image obtained by the server may be an image with a resolution equal to the preset resolution.

However, in some cases, a resolution of an original image obtained by the server may be inconsistent with the preset resolution. In this case, a manner in which the server obtains the to-be-processed image may be that after obtaining the original image, the server may first determine whether the resolution of the original image is consistent with the preset resolution; and if the resolution of the original image is consistent with the preset resolution, the server may directly use the original image as the to-be-processed image; or if the resolution of the original image is inconsistent with the preset resolution, the server may resize the original image, so that the resolution of the original image is equal to the preset resolution, and then a resized original image is used as the to-be-processed image.

S302: Perform vectorization based on the to-be-processed image, to obtain an image representation vector of the to-be-processed image.

After obtaining the to-be-processed image, the server may input the to-be-processed image to the image classification model, to perform vectorization by using the image classification model based on the to-be-processed image, to obtain the image representation vector. Alternatively, the server may also perform vectorization on the to-be-processed image by using a related image vector conversion model, to obtain the image representation vector. The image vector conversion model is a model configured to convert an image into a corresponding image representation vector, and is independent from the foregoing image classification model. This is not limited by this embodiment.

The image classification model is a neural network model, and may be, for example, a transformer model, or may be another model that can implement the method provided in embodiments consistent with the present disclosure. The structure of the image classification model is not limited by this embodiment. The image classification model may be pre-trained. In a training process thereof, a training sample is first obtained. A process in which the training sample is processed is similar to a manner in which the to-be-processed image is processed in this embodiment. However, the model may need to be optimized and adjusted based on a prediction result until an image classification model that satisfies a requirement is obtained.

Figure 4:
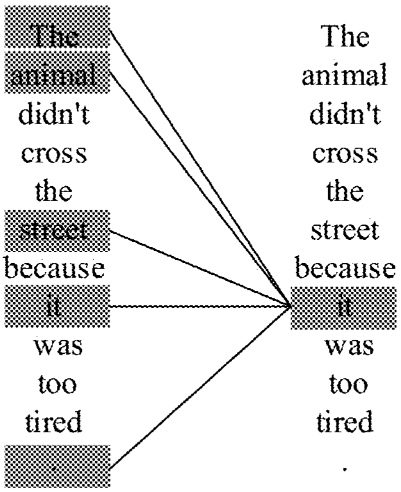
FIG. 4 is a diagram of learning a feature relationship among words in a language sequence according to an embodiment of this application.

The transformer model is a self-attention mechanism-based language model, a core of the model is a self-attention mechanism, and the mechanism may learn an inherent dependency relationship between data. FIG. 4 is a schematic diagram of learning a feature relationship among words in a language sequence. The language sequence in FIG. 4 may be "The animal didn't cross the street because it was too tired.". The feature relationship among the words is learned for each word in the language sequence, and the feature relationship may be an inherent dependency relationship among words (namely, data) learned and obtained by the transformer model by using the self-attention mechanism.

Figure 5:
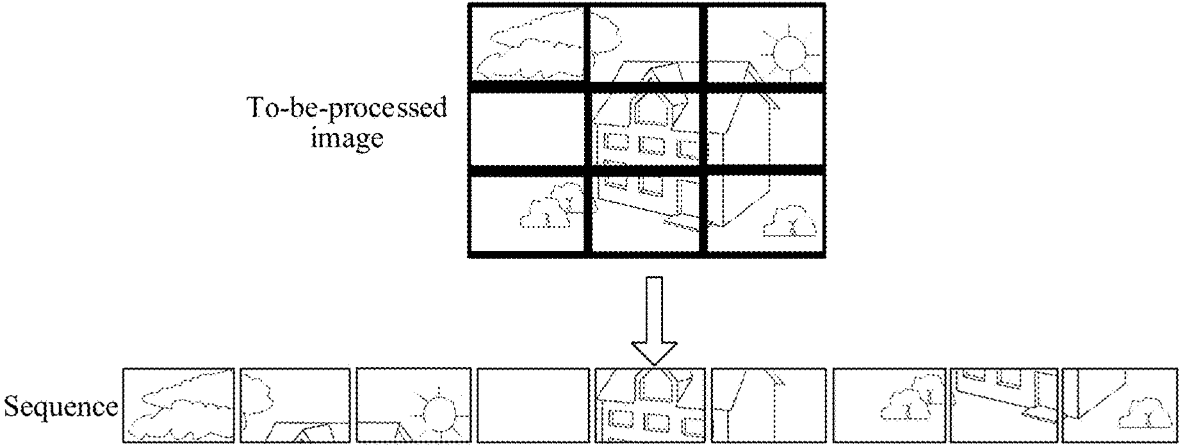
FIG. 5 is a diagram of cropping and dividing a to-be-processed image according to an embodiment of this application.

When the transformer model is used in an image field, to adapt to a core characteristic of the transformer model, an image (for example, the to-be-processed image) may be divided into several image patches, and then the patches are used as units in an image patch sequence for learning of a feature relationship between the units in the image patch sequence. Refer to FIG. 5. A to-be-processed image in FIG. 5 is divided into 3*3 patches, and the 3*3 patches are arranged in an order to obtain an image patch sequence, and then a feature relationship among the patches in the image patch sequence is learned.

Based on an application principle of the foregoing transformer model in the image field, the manner of performing vectorization based on the to-be-processed image, to obtain the image representation vector of the to-be-processed image may be: cropping and dividing the to-be-processed image into patches based on a patch_size to obtain a plurality of image patches, performing data structure mapping on the plurality of image patches to obtain one-dimensional structured data of the to-be-processed image, and then performing vectorization on the one-dimensional structured data to obtain the image representation vector.

The patch_size is a size of each image patch, and the patch_size may be preset based on an actual requirement. In a general case, the preset resolution is divisible by the patch_size. For example, if the preset resolution is 224*224, the patch_size may be 8, 14, 16, or the like. If the patch_size is 16, the to-be-processed image is divided into 14*14 patches in total. In one embodiment, the to-be-processed image may be cropped and divided into 56*56 patches, and the patch_size is 4.

It may be understood that after the to-be-processed image is cropped and divided, a plurality of patches are obtained, and in this case, the plurality of patches form two-dimensional structured data. However, in one embodiment, some image classification models, especially transformer models, are more suitable for processing one-dimensional structured data, so that data structure mapping may be performed on the plurality of patches, to map the two-dimensional structured data into the one-dimensional structured data suitable for processing by the image classification model.

Figure 6:
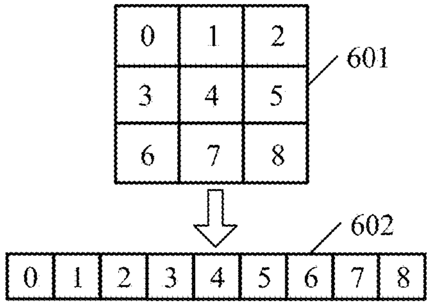
FIG. 6 is a diagram of flattening an image patch according to an embodiment of this application.

The data structure mapping may include a plurality of methods, which may be, for example, flattening, or may be linear projection. The flattening may be flattening each patch once after cropping, so that the patch is mapped from the two-dimensional structured data to the one-dimensional structured data suitable for processing by the image classification model. Refer to FIG. 6. An example in which a to-be-processed image is cropped and divided into 3*3 patches is used in FIG. 6. As shown in 601 in FIG. 6, the patches may be identified by numbers, which are 0, 1, 2, . . . , 7, and 8 respectively. Each patch is flattened once, so that the 3*3 patches are arranged into a sequence in an order, to obtain one-dimensional structured data, as shown in 602 in FIG. 6.

In this embodiment, if a quantity of configured patches is 56*56, a size of a single patch is 4*4, and an input image is a 3-channel color image, two-dimensional structured data of the patch may be [3, 4, 4] and is mapped into one-dimensional structured data [128] after flattening, and a length of the one-dimensional structured data may be set based on a service.

The linear projection may be mapping C*H*W (channel quantity*height*width) multi-dimensional structured data into one-dimensional structured data, for ease of subsequent learning.

For any language, a position and an arrangement order that are of a character in a sentence are very important, which are not only an integral part of a grammatical structure of a sentence, but also an important concept in expressing semantics. If a position or an arrangement order that is of a character in a sentence is different, a meaning of the entire sentence may be deviated. Therefore, when the transformer model is used in a language model, it is determined that position coding that can reflect a position of a word in a sentence is a very important strategy. Based on this, when the transformer model is used in the image field, in other words, used in the method provided in embodiments consistent with the present disclosure, reference still needs to be made to the position coding for image classification, in other words, position coding of an image patch is still an important strategy for an image classification task.

Therefore, in one embodiment, position vectors respectively corresponding to the plurality of image patches may be further obtained. In this way, when vectorization is performed on the one-dimensional structured data to obtain the image representation vector, vectorization may be performed on the one-dimensional structured data to obtain a patch vector corresponding to each image patch, to obtain the image representation vector based on the patch vector (obtained through patch embedding by an image patch embedding module) and a position vector (obtained through pos embedding by a pos embedding module) that correspond to each image patch.

A position of the image patch in the to-be-processed image is considered, and the image representation vector is obtained based on the position vector, so that position information of the image patch in the to-be-processed image may be obtained in subsequent feature mapping, so that information on which subsequent classification relies is rich, and a classification capability and classification accuracy are improved.

It is to be understood that, in this embodiment, the image classification model includes a feature mapping module and a classification module, the feature mapping module may include a network block, and a network block may include a network layer.

Figure 7:
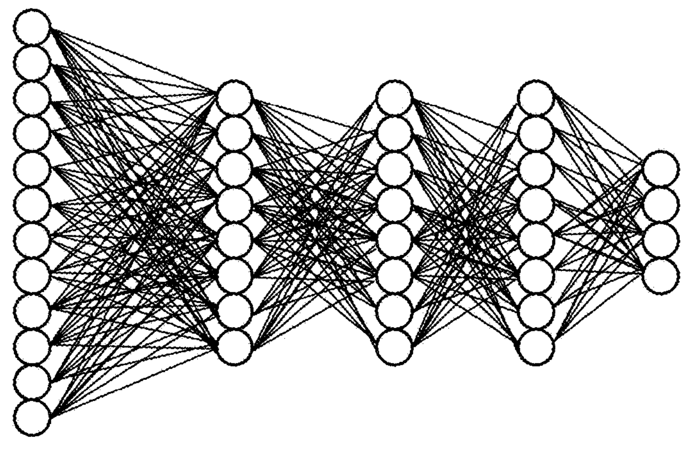
FIG. 7 is a diagram of a network layer according to an embodiment of this application.

In this embodiment, a block may include at least one layer, a neural network needs to repeatedly perform feature mapping from shallow to deep. Each feature mapping may be referred to as a layer. FIG. 7 shows a neural network including four layers.

Figure 8:
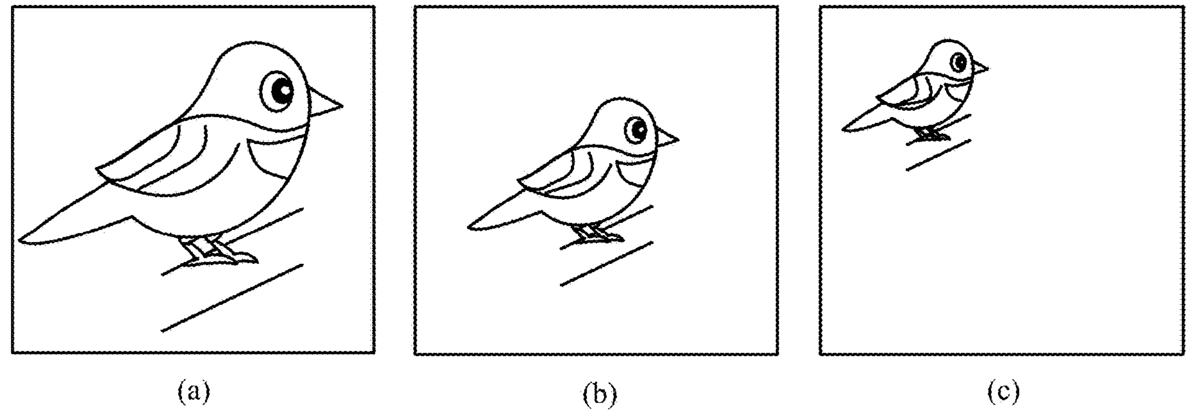
FIG. 8 is a diagram of a to-be-processed image including objects of different sizes according to an embodiment of this application.

The feature mapping module may include at least one block. In some cases, objects in the to-be-processed image may be of different sizes. Refer to FIG. 8. Objects in to-be-processed images shown in (a), (b), and (c) in FIG. 8 are birds, and sizes of the birds in the to-be-processed images shown in (a), (b), and (c) are different. To adapt to objects of different sizes and avoid information loss caused by learning at a single scale, in addition, because human observation and recognition of the to-be-processed image involve a multi-scale process from a whole to a part, or from a part to a whole, in this embodiment, a generally used feature mapping module may include a plurality of blocks, so that recognition and learning for the to-be-processed image may be performed at different scales for ease of learning features of different scales, where each block corresponds to a scale. For example, if a resolution of the to-be-processed image is 224*224, feature learning may be performed at a 56*56 scale, a 24*24 scale, and a 14*14 scale.

Figure 9:
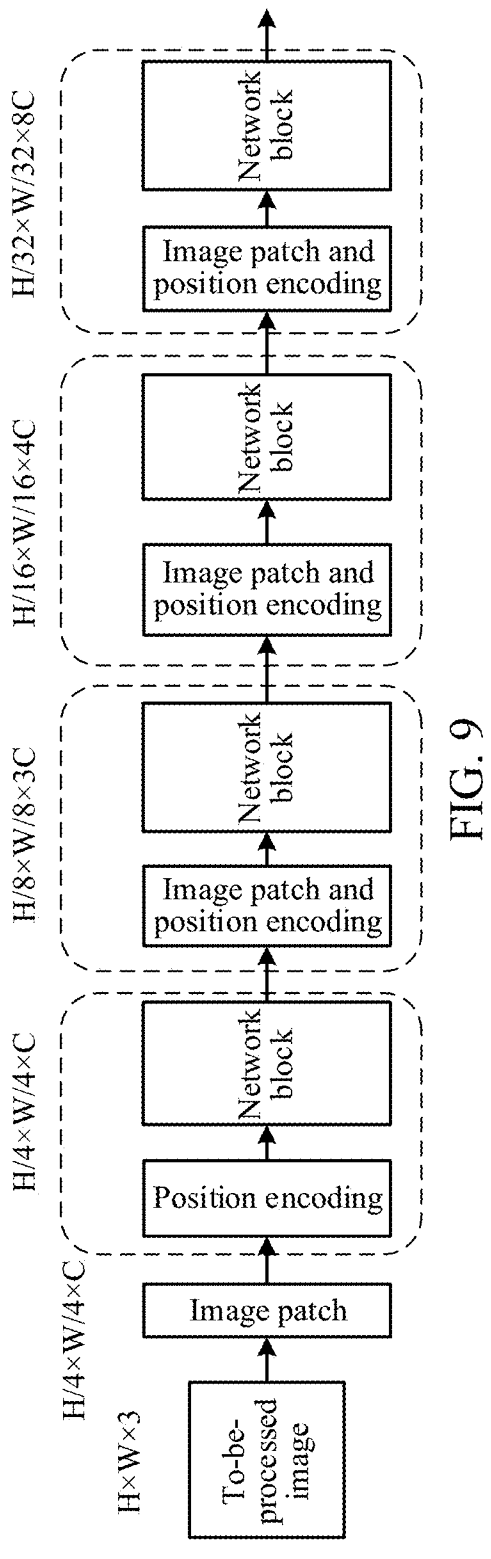
FIG. 9 is a diagram of an image classification model including a plurality of network blocks according to an embodiment of this application.

Based on the foregoing description about the block and the layer, to improve the classification capability of the image classification model, in one embodiment, the feature mapping module of the image classification model may include a plurality of blocks, and a single block may include a plurality of layers. An image classification model is shown in FIG. 9. The image classification model includes four network blocks, and image resolutions processed by the blocks are ¼, ⅛, 1/16, and 1/32 respectively. Each block may include a different quantity of layers according to a network characteristic of the block.

S303: Perform feature mapping on the image representation vector by using a network block included in the feature mapping module in the image classification model, to obtain an image feature of the to-be-processed image.

The server may perform feature mapping on the image representation vector by using the feature mapping module, to obtain the image feature of the to-be-processed image, and specifically, may perform feature mapping on the image representation vector by using the network block included in the feature mapping module, to obtain the image feature of the to-be-processed image.

In one embodiment, to learn the image feature at different scales, the feature mapping module may include a plurality of network blocks, and each network block is subsequently connected to a down-sampling module, where each network block is configured to perform feature mapping to obtain a feature map at a corresponding scale, and the down-sampling module is configured to reduce a scale of a feature map outputted by the connected network block, to obtain a feature map of another scale, so that a next network block may learn a feature at the another scale to obtain a feature map. A quantity of network blocks may be determined based on an actual service requirement, and the quantity of network blocks is not limited by this embodiment. Next, a process of learning the image feature by using a plurality of network blocks at different scales is described by using an example in which the feature mapping module includes two network blocks (for example, a first network block and a second network block).

In this case, feature mapping may be performed on the image representation vector by using the first network block, to obtain a first feature map of the to-be-processed image, and then the first feature map is down-sampled by using a down-sampling module connected to the first network block, to obtain a first-scale feature map. Next, feature mapping is performed on the first-scale feature map by using the second network block, to obtain a second feature map of the to-be-processed image, and then the second feature map is down-sampled by using a down-sampling module connected to the second network block, to obtain a second-scale feature map, to obtain the image feature of the to-be-processed image based on the second-scale feature map. When the feature mapping module further includes other network blocks, after the second-scale feature map is obtained, the rest may be deduced by analogy based on the foregoing method, until a last network block and a down-sampling module connected to the last network block complete processing and the final image feature is obtained.

The feature map may be further referred to as a feature mapping image. Data obtained after data (for example, the image representation vector in this embodiment) is processed/mapped through a specified method is generally referred to as the feature map. The neural network is an algorithm system mapping high-dimensional data into low-dimensional data through a plurality of times of feature mapping. An original dimension of a color image (for example, the to-be-processed image) of a 1024*1024 size is 3*1024*1024. If 100 categories are set, the original dimension finally becomes 100 dimensions after layers of feature mapping. A value of each dimension corresponds to a probability value of a category. The probability value reflects a probability that the to-be-processed image is determined to be of the category.

Specifically, the feature mapping module includes one block to n blocks (e.g., four blocks, which are a block 1, a block 2, a block 3, and a block 4 respectively), where each block further includes layers that are of different quantities and of the same structure. To learn the image feature at different scales, each block needs to be subsequently connected to a down-sampling module to reduce by half of a size of the feature map. By using four blocks as an example, size transformation during obtaining the image feature is as follows: a size of the to-be-processed image is 3*224*224, a size after the to-be-processed image is cropped and divided into patches is 3*56*56*4*4, a size after patch embedding and pos embedding is 56*56*128, a size of a feature map after block 1 processing and down-sampling by a down-sampling module is 28*28*256, a size of a feature map after block 2 processing and down-sampling by a down-sampling module is 14*14*512, a size of a feature map after block 3 processing and down-sampling by a down-sampling module is 7*7*1024, and a size of a feature map after block 4 processing and down-sampling by a down-sampling module is 1*1024.

In this embodiment, the image feature can be learned at the plurality of scales by using the plurality of network blocks, to accurately recognize objects of different scales in the to-be-processed image and improve a classification recognition capability.

S304: Perform, during obtaining the image feature by using the network block, at a same network layer of the network block, global feature mapping on input content by using the network layer to obtain a global feature, and perform local feature mapping on the input content by using the network layer to obtain a local feature, the input content being obtained based on the image representation vector; perform feature fusion on the global feature and the local feature by using the network layer, to obtain a fused feature corresponding to the network layer; and obtain the image feature based on the fused feature corresponding to the network layer.

In this embodiment, a method of processing the input content in a layer is core content of this embodiment. In this embodiment, feature extraction may be performed on the input content at the same network layer in a plurality of methods to obtain a plurality of features, so that feature fusion is performed on the plurality of features to obtain the fused feature, to obtain the final image feature based on the fused feature corresponding to the network layer. For example, global feature mapping may be performed on the input content by using the network layer to obtain a global feature, and local feature mapping may be performed on the input content by using the network layer to obtain a local feature, so that feature fusion is performed on the global feature and the local feature, to obtain a fused feature corresponding to the network layer, and then the image feature is obtained based on the fused feature corresponding to the network layer.

The input content may be obtained based on the image representation vector. When the network layer is a first network layer in a first network block, the input content may be the image representation vector; and when the network layer is another network layer, because the image representation vector has been processed by a previous network layer, the input content of the network layer may be a result obtained after processing by the previous network layer. For example, the input content may be a feature map obtained after processing by the previous network layer.

The global feature mapping may be implemented through any method in which the global feature can be obtained. For example, the global feature mapping may be implemented through a global-attention mechanism. The global-attention mechanism may be self-attention. In the self-attention, learning of a feature relationship is performed on each unit and all other units, so that the self-attention may be the global-attention mechanism. Refer to FIG. 5. Each image patch in FIG. 5 may be used as a unit, so that for each image patch, learning of the feature relationship is performed on the image patch and all other image patches.

Figure 10:
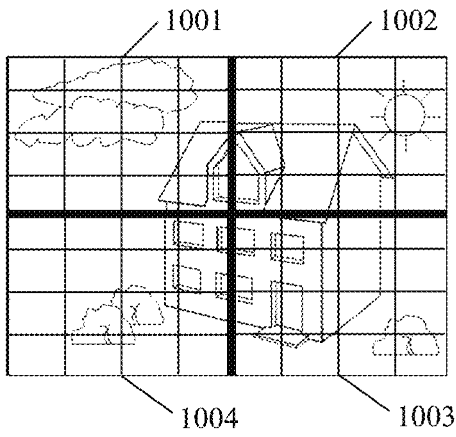
FIG. 10 is a diagram of the principle of local-attention according to an embodiment of this application.

The local feature mapping may be implemented through any method in which the local feature can be obtained. For example, the local feature mapping may be implemented through a local-attention mechanism. In some cases, a quantity of units included in the sequence is particularly large. To reduce consumption of computing resources, the sequence is grouped. The self-attention is used in each group, and a model parameter is shared between the groups. The method in which the feature relationship is learned in only a specified local area is referred to as the local-attention mechanism. As shown in FIG. 10, an entire image (for example, the to-be-processed image) is divided into four patches as shown 1001, 1002, 1003, and 1004 respectively in FIG. 10. Each patch is further divided into a plurality of image patches. For example, the patch shown in 1001 is divided into 4*4 image patches, likewise the other three patches. The self-attention is used for the plurality of image patches in each patch.

Figure 11:
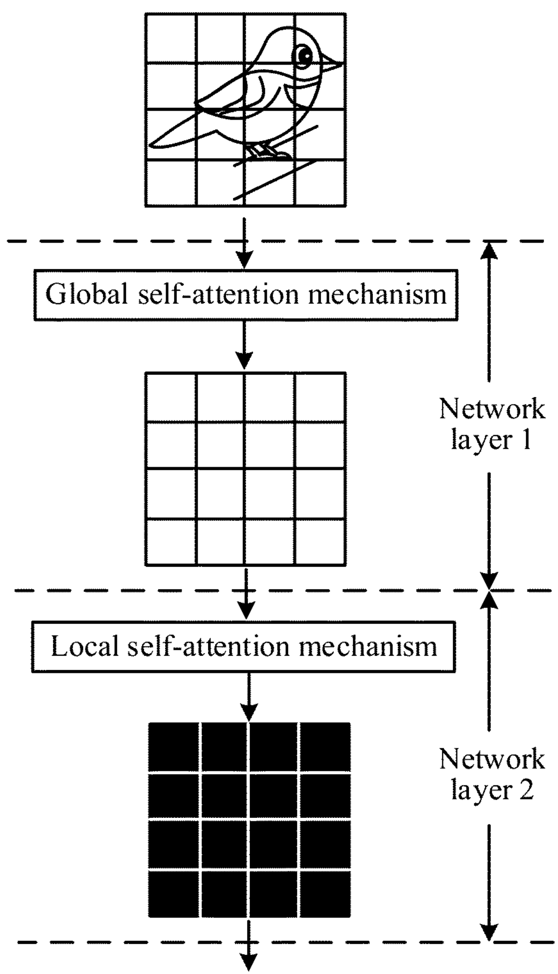
FIG. 11 is a diagram of a processing procedure of a hierarchical feature fusion solution.

In the hierarchical feature fusion solution, the image feature is learned in two manners: the global-attention and the local-attention. Each network layer specifically learns a feature, and different layers alternately use different features. As shown in FIG. 11, a network layer 1 uses the global-attention mechanism to learn the global feature, and a network layer 2 uses the local-attention mechanism to learn the local feature. Because the local-attention and the global-attention are alternately used, a capability of fusion between the two image features is weak. In addition, different semantic ranges are relied on at different spatial positions. Some features are only local features, and some features are global features. In the hierarchical feature fusion solution, each feature learning is all about a global feature or a local feature. As a result, a network layer that learns the local feature ignores global information, while a network layer that learns the global feature ignores local information.

Different from the hierarchical feature fusion solution shown in FIG. 11, in this embodiment, a plurality of features such as a global feature and a local feature can be obtained at a same network layer, and the plurality of features are fused at a same layer, to resolve a problem that the transformer pays no attention to the local feature, and simultaneously resolve problems of unintelligent feature fusion, a weak feature fusion capability, and incomplete feature learning in the hierarchical feature fusion solution.

In this embodiment, the plurality of features learned in the same network layer may further include another feature other than the local feature and the global feature. A quantity and types of the plurality of features learned at the same network layer are not limited by this embodiment. In one embodiment, the plurality of features learned in the same network layer may further include a convolutional feature. Specifically, convolutional feature mapping may be performed on the image representation vector by using the network layer to obtain the convolutional feature, and then feature fusion is performed on the global feature, the local feature, and the convolutional feature by using the network layer, to obtain the fused feature corresponding to the network layer.

Figure 12:
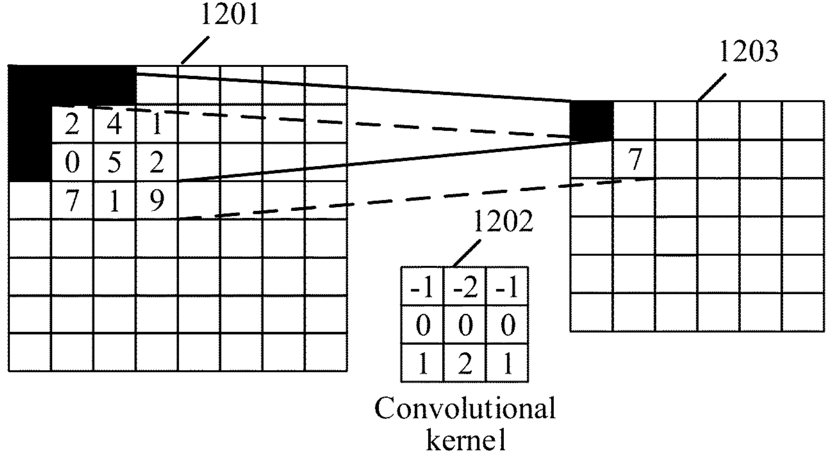
FIG. 12 is a diagram of a principle of a convolutional neural network according to an embodiment of this application.

The convolutional feature mapping may be implemented by using a convolutional neural network (CNN). The convolutional neural network is a type of feedforward neural network including convolutional or related computation and having a deep structure. A core of the convolutional neural network is a convolutional operator. A feature obtained by the convolutional operator by processing an image by using a convolutional kernel is referred to as the convolutional feature (namely, a CNN feature). The CNN feature is a feature for learning a local dependency relationship. Refer to FIG. 12. 1201 is the to-be-processed image, and a convolutional feature shown in 1203 may be obtained by processing by a convolutional kernel shown in 1202. It may be seen from FIG. 12 that each feature token is related to 8 tokens surrounding the feature token.

Figure 13:
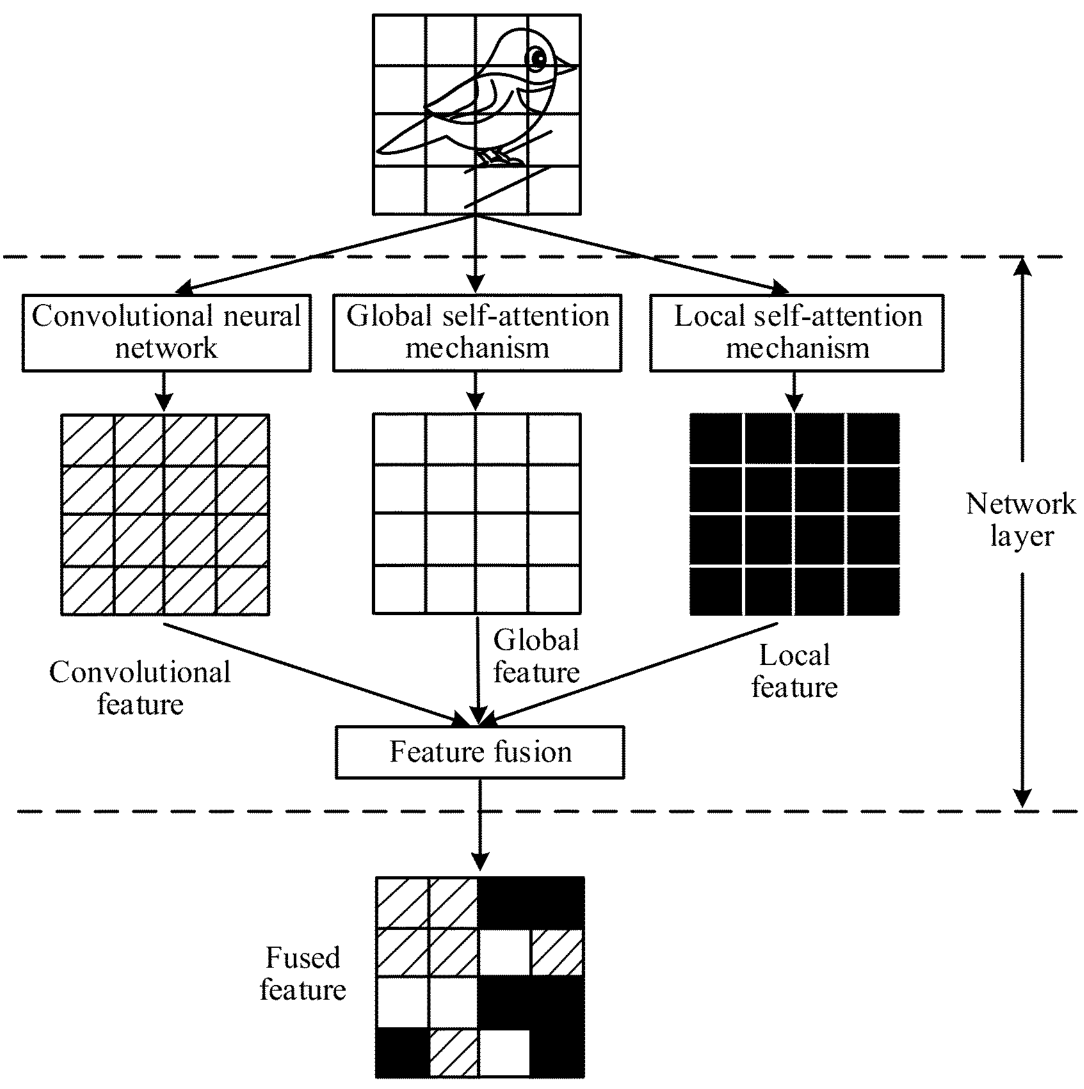
FIG. 13 is a diagram of a processing procedure of determining a fused feature according to an embodiment of this application.

Based on the foregoing description, an example in which the foregoing three features are obtained at the same network layer is used. For an example diagram of a process procedure of determining the fused feature, refer to FIG. 13. In FIG. 13, for the to-be-processed image, the convolutional feature is obtained by using the convolutional neural network, the global feature is obtained through the global-attention mechanism, the local feature is obtained through the local-attention mechanism, and feature fusion is performed on the convolutional feature, the global feature, and the local feature to obtain the fused feature.

It may be understood that, a plurality of methods in which the feature fusion is performed at the network layer to obtain the fused feature may be included. In one embodiment, a method of feature fusion may be performing weighted summation on the plurality of features. In a general case, weight values respectively corresponding to the plurality of features may be obtained through calculation based on the features, or may be preset. In a possible case, a sum of the weight values of the plurality of features may be 1.

An example in which the plurality of features obtained at the same network layer include the global feature and the local feature is used. A manner in which feature fusion is performed on the global feature and the local feature by using the network layer, to obtain the fused feature corresponding to the network layer may be that weight values respectively corresponding to the global feature and the local feature are determined, a sum of a weight value of the global feature and a weight value of the local feature is 1, and weighted summation is performed on the global feature and the local feature based on the weight values, to obtain the fused feature.

When the plurality of features further include the convolutional feature, weight values respectively corresponding to the convolutional feature, the global feature, and the local feature are determined, a sum of a weight value of the convolutional feature, a weight value of the global feature, and a weight value of the local feature is 1, and weighted summation is performed on the convolutional feature, the global feature, and the local feature based on the weight values, to obtain the fused feature.

The manner of feature fusion may be different based on a difference in a weight value distribution of the plurality of features. One is fusion in a soft method, in other words, performing weighted summation on the plurality of features by using vectors (each vector is used as a weight value corresponding to a feature) that sum up to 1. For example, if the plurality of features include three features, vectors corresponding to a plurality of weight values may be represented as [0.2, 0.5, 0.3]. For another example, if the plurality of features include two features, vectors corresponding to a plurality of weight values may be represented as [0.4, 0.6].

Figure 14:
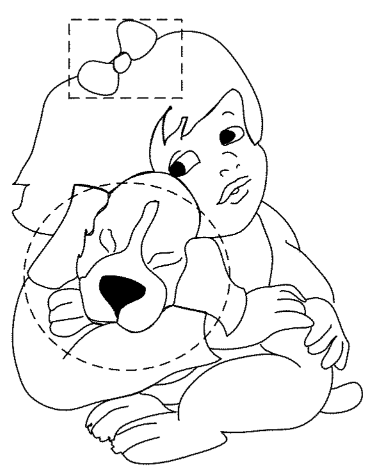
FIG. 14 is a diagram of a valid feature and an invalid feature according to an embodiment of this application.

However, in some cases, in the plurality of features obtained by using the same network layer, some features may be invalid or harmful features. Refer to FIG. 14. FIG. 14 shows what are valid features and invalid features. A classification target of a to-be-processed image is a dog in the image, an image feature that is useful for recognizing the dog is basically within a circular dotted box, and a feature outside the circular dotted box is basically useless or harmful (causing ambiguity in the model). A rectangular dotted box in FIG. 14 is also an area that the model considers to be of concern after calculation, but it is clear that the area is not helpful in recognizing the dog, so that a feature corresponding to the area is also invalid and needs to be prevented from being passed to a next network layer.

To avoid bringing an invalid or harmful feature to the next network layer, in other words, to avoid passing the invalid or the harmful feature backward, the invalid or harmful feature may be completely discarded, to skip being passed to the next network layer. Based on this, another method of feature fusion may be setting a weight value of a feature to 1 and setting another weight value to 0. If an example in which the plurality of features include the global feature and the local feature is used, a weight value in the weight value of the global feature and the weight value of the local feature is 1, and an other weight value is 0. The foregoing method of feature fusion may be referred to as fusion in a hard method. The fusion in the hard method is also a type of weighted summation. A difference from the fusion in the soft method is that a weighted vector is in a one-hot form, in other words, only one component is 1 and the rest are all 0, for example, [0, 1, 0].

In one embodiment, a method in which the weight values respectively corresponding to the global feature and the local feature are determined may be that addition is performed based on the global feature and the local feature to obtain an added feature, and probability estimation is performed by using a probability estimation module based on the added feature, to obtain the weight values respectively corresponding to the global feature and the local feature.

When the plurality of features further include the convolutional feature, the method may be that addition is performed based on the convolutional feature, the global feature, and the local feature to obtain an added feature, and probability estimation is performed by using the probability estimation module based on the added feature, to obtain the weight values respectively corresponding to the convolutional feature, the global feature, and the local feature. For details, refer to FIG. 15. When addition is performed based on the convolutional feature, the global feature, and the local feature, addition may be performed by using each image patch as a unit, and an added feature corresponding to each patch is obtained after each patch is added, to form the final added feature. Subsequently, a fully connected layer may be used, to reduce a feature dimension to 3, and then the probability estimation module is used to perform probability estimation, to obtain the weight values respectively corresponding to the convolutional feature, the global feature, and the local feature.

Figure 16:
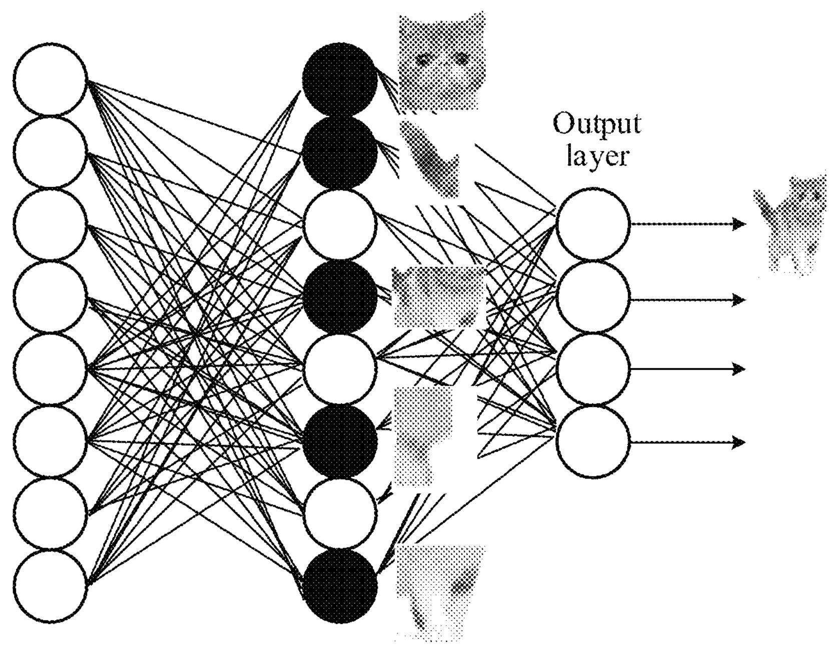
FIG. 16 is a diagram of a principle of a fully connected layer according to an embodiment of this application.

The fully connected layer is generally used at an end of a classification network, to map the feature dimension to a quantity of categories, and then the probability estimation module is used to perform probability estimation. For example, if a feature dimension finally outputted through feature mapping is 1024, and a to-be-classified category is 100 categories, the fully connected layer may map a feature of a 1024 length to a feature of a 100 length, and then the probability estimation module is used to estimate a probability distribution of the to-be-processed image on the 100 categories, where a category with a greatest probability value is a category determined by the network. Refer to FIG. 16. Traversing is performed for the fully connected layer. A black part represents that a corresponding feature (for example, a head, feet, a body, a tail, or legs of a cat in FIG. 16) is found. Features in the figure are combined and outputted to an output layer, and are then classified to obtain a conclusion that this is a cat. It may be understood that, using the fully connected layer for determining the weight value is also based on a similar principle, and details are not described herein again.

Figure 17:
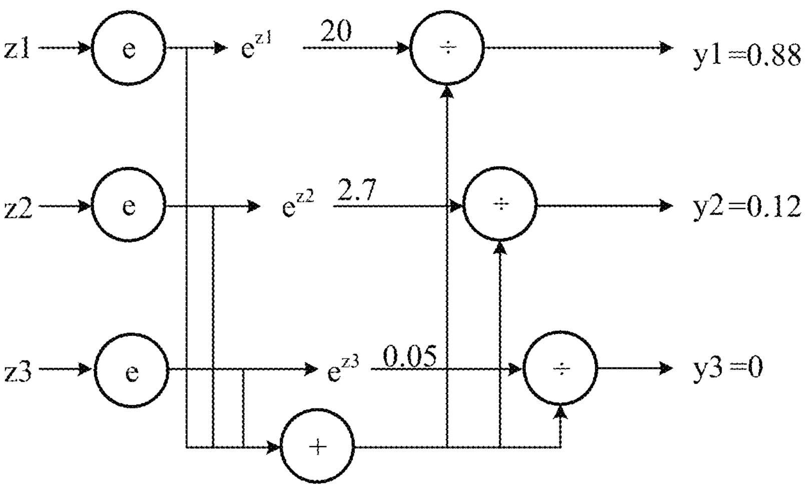
FIG. 17 is a diagram of a principle of a softmax function according to an embodiment of this application.

It may be understood that, the probability estimation module may be different based on a difference in a used fusion method. When the fusion in the soft method is used, the probability estimation module may be implemented by using a softmax function, in other words, probability estimation is performed by using the softmax function, to obtain a probability distribution with a sum of 1 in the soft method, and each probability value may be used as a weight value of a corresponding feature. The softmax function is a normalized exponential function, and is generally used after the fully connected layer to estimate a category probability distribution. In this embodiment, when feature fusion is performed on various features, probability estimation is also performed on the different features by using the softmax function, and a method of feature fusion using the softmax function is referred to as soft fusion. For an example diagram of a principle of the softmax function, refer to FIG. 17. z1, z2, and z3 are inputted, and y1, y2, and y3 may be outputted through internal processing, where y1=0.88, y2=0.12, and y3=0.1>yi>0, i=1, 2, or 3, and a sum of y1, y2, and y3 is 1.

Specifically, yi may be calculated by using the following formulas:

$$y1 = e^{z1}/\sum_{j=1}^{3} e^{zj},\ y2 = e^{z2}/\sum_{j=1}^{3} e^{zj},$$

$$\text{and } y3 = e^{z3}/\sum_{j=1}^{3} e^{zj}, \text{ where } e^{z1}, e^{z2}, \text{ and } e^{z3}$$

may be intermediate processing parameters of the softmax function.

When the fusion in the hard method is used, the probability estimation module may be implemented by using a gumbel-softmax function, in other words, probability estimation is performed by using the gumbel-softmax function, and a probability distribution in a one-hot form is obtained, in other words, only one probability value is 1, and the rest probability values are 0. Each probability value may be used as a weight value of a corresponding feature.

A probability value estimated by gumbel-softmax is a probability distribution with a sum of 1, and the probability distribution estimated by the gumbel-softmax is in the one-hot form, in other words, only one probability value is 1, and the rest probability values are 0. It may be understood that the gumbel-softmax is an upgrade version of softmax, a weighted sum thereof is still 1, but energy thereof all focuses on one probability value.

Figure 15:
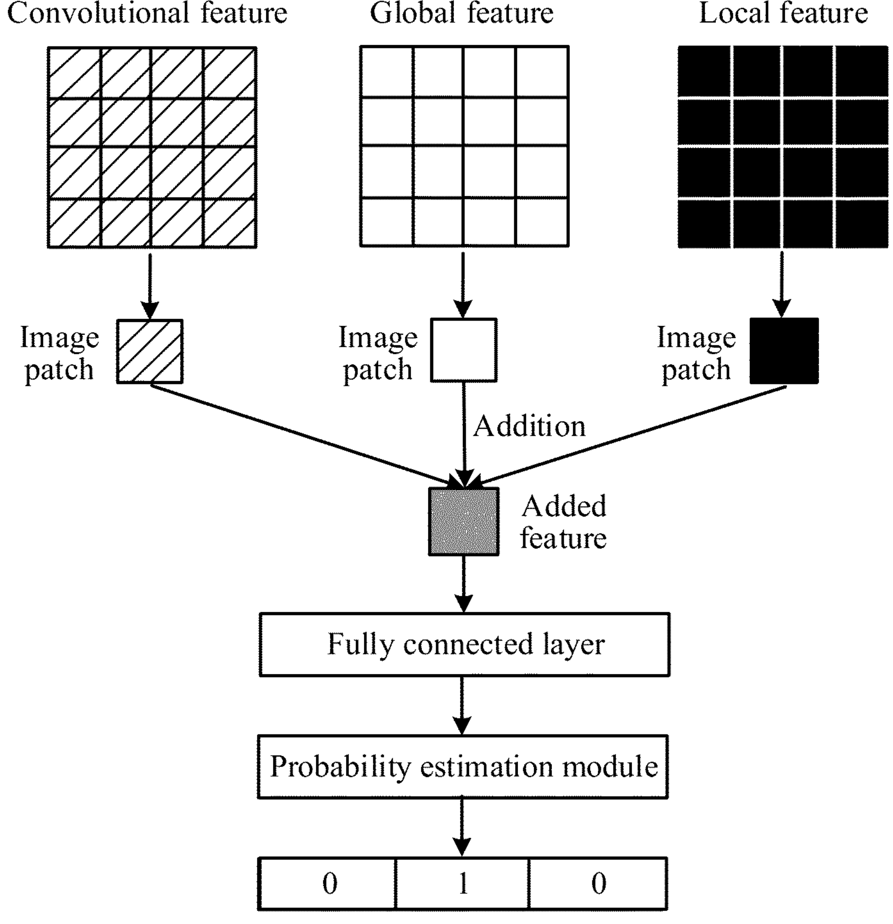
FIG. 15 is a diagram of a processing procedure of determining a weight value according to an embodiment of this application.

Refer to FIG. 15. Probability values obtained in FIG. 15 are 0, 1, and 0 respectively. According to an arrangement order thereof and an arrangement order of the plurality of features inputted in FIG. 15, it may be determined that the weight value of the convolutional feature and the weight value of the local feature are 0, and the weight value of the global feature is 1.

S305: Perform category prediction by using a classification module in the image classification model based on the image feature, to obtain a classification result of the to-be-processed image.

The server may perform category prediction by using the classification module in the image classification model based on the finally obtained image feature to obtain the classification result. In one embodiment, the image classification model may further include a fully connected layer. In this case, a method of obtaining the classification result may be performing fully connected calculation on the image feature by using the fully connected layer, and mapping the image feature into a classification quantity length, to perform category prediction by using the classification module based on the image feature of the classification quantity length, to obtain the classification result.

The classification quantity length may be determined based on a specific service. In a general case, 1000 is a commonly used classification quantity (namely, a quantity of categories), so that 1*1000 may be used as the classification quantity length. The classification module may be implemented based on the softmax function. A probability value of each category is obtained through softmax calculation, so that a category with a greatest probability value is determined as the classification result.

The method provided in embodiments consistent with the present disclosure is superior to the related art for a common image classification evaluation data set in the industry, and has stable improvement in parameters of models of different scales. The method provided in embodiments consistent with the present disclosure may also be applied to an optical character recognition (OCR) product. The method provided in embodiments consistent with the present disclosure has stable improvement in Chinese and English, print, and handwriting. An effect comparison of the method provided in embodiments consistent with the present disclosure and the related art is shown in Table 1:

mapping are performed, by using the network layer, on input content obtained based on the image representation vector, to obtain a global feature and a local feature, feature fusion is performed on the global feature and the local feature by using the network layer, to obtain a fused feature corresponding to the network layer, and the image feature is obtained based on the fused feature corresponding to the network layer. Because a plurality of features are fused in the same network layer to obtain the final image feature, the local feature and the global feature can be simultaneously learned, resolving a problem caused by paying no attention to the local feature in a transformer solution, and additionally improving a capability of fusion between the plurality of features. In this way, when category prediction is performed by using a classification module based on the image feature to obtain a classification result, because the local feature and the global feature are fused in the image feature, the to-be-processed image can be accurately classified even for images with objects having similar appearance features, thereby improving the quality of classification.

Based on the foregoing introduction to the method provided in embodiments consistent with the present disclosure, the following uses an image classification model with a specific structure as an example to introduce the method provided in embodiments consistent with the present disclosure. The image classification model includes an image patch embedding module, a pos embedding module, a feature mapping module, a fully connected layer, and a classification module. The feature mapping module includes four network blocks, for example, a network block 1, a network block 2, a network block 3, and a network block 4.

TABLE 1

| Image classification evaluation data set | Character-recall | Character-precision | Word-recall | Word-precision | Character-precision | Character-precision | Word-recall | Word-precision |
|---|---|---|---|---|---|---|---|---|
| Table | 95.88 | 96.49 | 89.56 | 80.12 | 95.84 | 96.54 | 91.35 | 80.26 |
| . . . | . . . | . . . | . . . | . . . | . . . | . . . | . . . | . . . |
| Document | 97.4 | 96.35 | 89.48 | 86.01 | 97.61 | 96.43 | 89.86 | 88.2 |
| Icon | 94.58 | 89.16 | 91.08 | 89.23 | 93.14 | 86.23 | 91.41 | 89.77 |
| Word art | 82.41 | 85.15 | 43.5 | 24.41 | 83.64 | 85.88 | 43.6 | 24.29 |
| . . . | . . . | . . . | . . . | . . . | . . . | . . . | . . . | . . . |

In Table 1, a 2nd column to a 5th column from left to right are indicator values respectively corresponding to four indicators in the related art. A 6th column to a 9th column are indicator values respectively corresponding to the foregoing four indicators in the method provided in embodiments consistent with the present disclosure. From the indicator values corresponding to the two solutions under the same indicator, it may be seen that compared with the related art, the method provided in embodiments consistent with the present disclosure has improvement in a classification effect.

It may be seen from the foregoing technical solutions that when a to-be-processed image needs to be classified, vectorization may be performed based on the to-be-processed image, to obtain an image representation vector of the to-be-processed image. Then feature mapping is performed on the image representation vector by using a network block included in a feature mapping module in an image classification model, to obtain an image feature of the to-be-processed image. During obtaining the image feature by using the network block, at a same network layer of a network block, global feature mapping and local feature Each network block is subsequently connected to a down-sampling module, and the classification module may be implemented by using a softmax function, as shown in FIG. 18.

Figure 18:
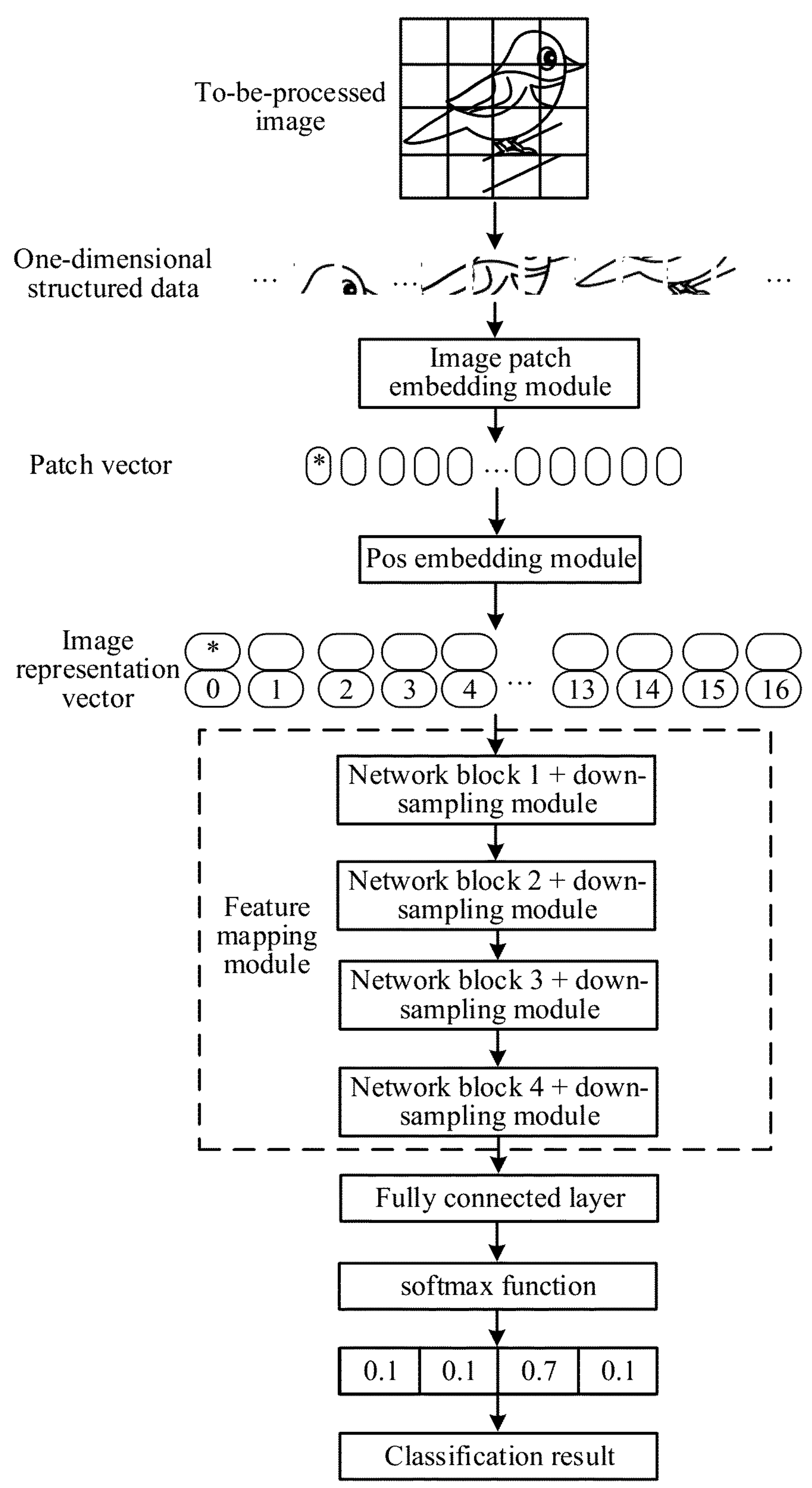
FIG. 18 is a diagram of an overall framework of an image processing method according to an embodiment of this application.

Based on the image classification model shown in FIG. 18, when a to-be-processed image is obtained, the to-be-processed image may be cropped and divided to obtain a plurality of image patches, and data structure mapping is performed on the plurality of patches, to map two-dimensional structured data into one-dimensional structured data suitable for processing by the image classification model. Subsequently, patch embedding is performed on the one-dimensional structured data by using the image patch embedding module, to obtain a patch vector, pos embedding is performed by using the pos embedding module to obtain a position vector, and a final image representation vector is obtained based on the position vector and the patch vector. The image representation vector is inputted to the feature mapping module, and processing is performed by using the network block 1, the network block 2, the network block 3, the network block 4, and respectively corresponding down-sampling modules to obtain a final image feature. For a manner of performing feature mapping at the same network layer of a network block, refer to FIG. 13 and corresponding description. Details are not described herein again. Next, fully connected calculation is performed on the image feature by using the fully connected layer, and the image feature is mapped into a classification quantity length, to estimate a probability value based on the image feature of the classification quantity length by using the softmax function. The probability values may be, for example, 0.1, 0.1, 0.7, and 0.1 respectively as shown in FIG. 18. A classification result is thereby obtained based on the probability values. For example, a category with the greatest probability value may be used as the classification result.

In this application, based on the implementations according to the foregoing aspects, further combination may be performed, to provide more implementations.

Figure 19:
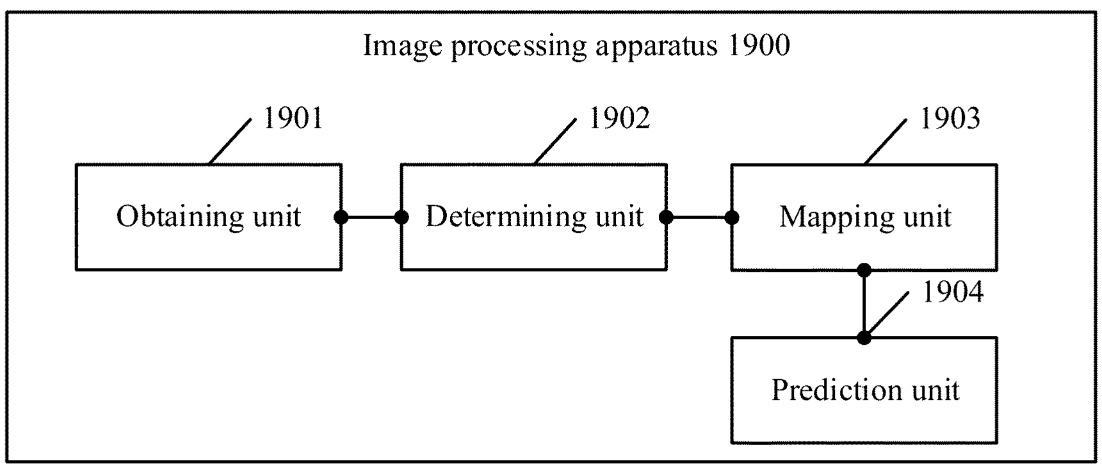
FIG. 19 is a diagram of an image processing apparatus according to an embodiment of this application.

Based on the image processing method provided in the embodiment corresponding to FIG. 3, an embodiment of this application further provides an image processing apparatus 1900. Refer to FIG. 19. The image processing apparatus 1900 includes an obtaining unit 1901, a determining unit 1902, a mapping unit 1903, and a prediction unit 1904, the obtaining unit 1901 being configured to obtain a to-be-processed image;

the determining unit 1902 being configured to perform vectorization based on the to-be-processed image, to obtain an image representation vector of the to-be-processed image;

the mapping unit 1903 being configured to perform feature mapping on the image representation vector by using a network block included in a feature mapping module in an image classification model, to obtain an image feature of the to-be-processed image;

the mapping unit 1903 being specifically configured to perform, during obtaining the image feature by using the network block, at a same network layer of the network block, global feature mapping on input content by using the network layer to obtain a global feature, and perform local feature mapping on the input content by using the network layer to obtain a local feature, the input content being obtained based on the image representation vector; perform feature fusion on the global feature and the local feature by using the network layer, to obtain a fused feature corresponding to the network layer; and obtain the image feature based on the fused feature corresponding to the network layer; and the prediction unit 1904 being configured to perform category prediction by using a classification module in the image classification model based on the image feature, to obtain a classification result of the to-be-processed image.

In one embodiment, the mapping unit 1903 is specifically configured to:

determine weight values respectively corresponding to the global feature and the local feature, where a sum of a weight value of the global feature and a weight value of the local feature is 1; and perform weighted summation on the global feature and the local feature based on the weight values, to obtain the fused feature.

In one embodiment, a weight value in the weight value of the global feature and the weight value of the local feature is 1, and an other weight value is 0.

In one embodiment, the mapping unit 1903 is specifically configured to:

perform addition based on the global feature and the local feature, to obtain an added feature; and perform probability estimation by using a probability estimation module based on the added feature, to obtain the weight values respectively corresponding to the global feature and the local feature.

In one embodiment, the mapping unit 1903 is further configured to:

perform convolutional feature mapping on the image representation vector by using the network layer, to obtain a convolutional feature; and perform feature fusion on the global feature, the local feature, and the convolutional feature by using the network layer, to obtain the fused feature corresponding to the network layer.

In one embodiment, the feature mapping module includes a plurality of network blocks, each network block is subsequently connected to a down-sampling module, the plurality of network blocks includes a first network block and a second network block, and the mapping unit 1903 is specifically configured to:

perform feature mapping on the image representation vector by using the first network block, to obtain a first feature map of the to-be-processed image;

down-sample the first feature map by using a down-sampling module connected to the first network block, to obtain a first-scale feature map;

perform feature mapping on the first-scale feature map by using the second network block, to obtain a second feature map of the to-be-processed image;

down-sample the second feature map by using a down-sampling module connected to the second network block, to obtain a second-scale feature map; and obtain the image feature of the to-be-processed image based on the second-scale feature map.

In one embodiment, the determining unit 1902 is specifically configured to:

crop and divide the to-be-processed image based on a patch_size, to obtain a plurality of image patches;

perform data structure mapping on the plurality of image patches, to obtain one-dimensional structured data of the to-be-processed image; and perform vectorization on the one-dimensional structured data, to obtain the image representation vector.

In one embodiment, the obtaining unit 1901 is further configured to:

obtain position vectors respectively corresponding to the plurality of image patches; and the determining unit 1902 is specifically configured to perform vectorization on the one-dimensional structured data, to obtain a patch vector corresponding to each image patch; and obtain the image representation vector based on the patch vector and a position vector that correspond to each image patch.

In one embodiment, the image classification model further includes a fully connected layer, and the prediction unit 1904 is specifically configured to:

perform fully connected calculation on the image feature by using the fully connected layer, and map the image feature into a classification quantity length; and perform category prediction by using the classification module based on the image feature of the classification quantity length, to obtain the classification result.

It may be seen from the foregoing technical solutions that when a to-be-processed image needs to be classified, vectorization may be performed based on the to-be-processed image, to obtain an image representation vector of the to-be-processed image. Then feature mapping is performed on the image representation vector by using a network block included in a feature mapping module in an image classification model, to obtain an image feature of the to-be-processed image. During obtaining the image feature by using the network block, at a same network layer of a network block, global feature mapping and local feature mapping are performed, by using the network layer, on input content obtained based on the image representation vector, to obtain a global feature and a local feature, feature fusion is performed on the global feature and the local feature by using the network layer, to obtain a fused feature corresponding to the network layer, and the image feature is obtained based on the fused feature corresponding to the network layer. Because a plurality of features are fused in the same network layer to obtain the final image feature, the local feature and the global feature can be simultaneously learned, resolving a problem caused by paying no attention to the local feature in a transformer solution, and additionally improving a capability of fusion between the plurality of features. In this way, when prediction is performed by using a classification module based on the image feature to obtain a classification result, because the local feature and the global feature are fused in the image feature, the to-be-processed image can be accurately classified even for images with objects having similar appearance features, thereby improving the quality of classification.

An embodiment of this application further provides a computer device. The computer device may perform an image processing method. The computer device may be, for example, a terminal. An example in which the terminal is a smartphone is used.

Figure 20:
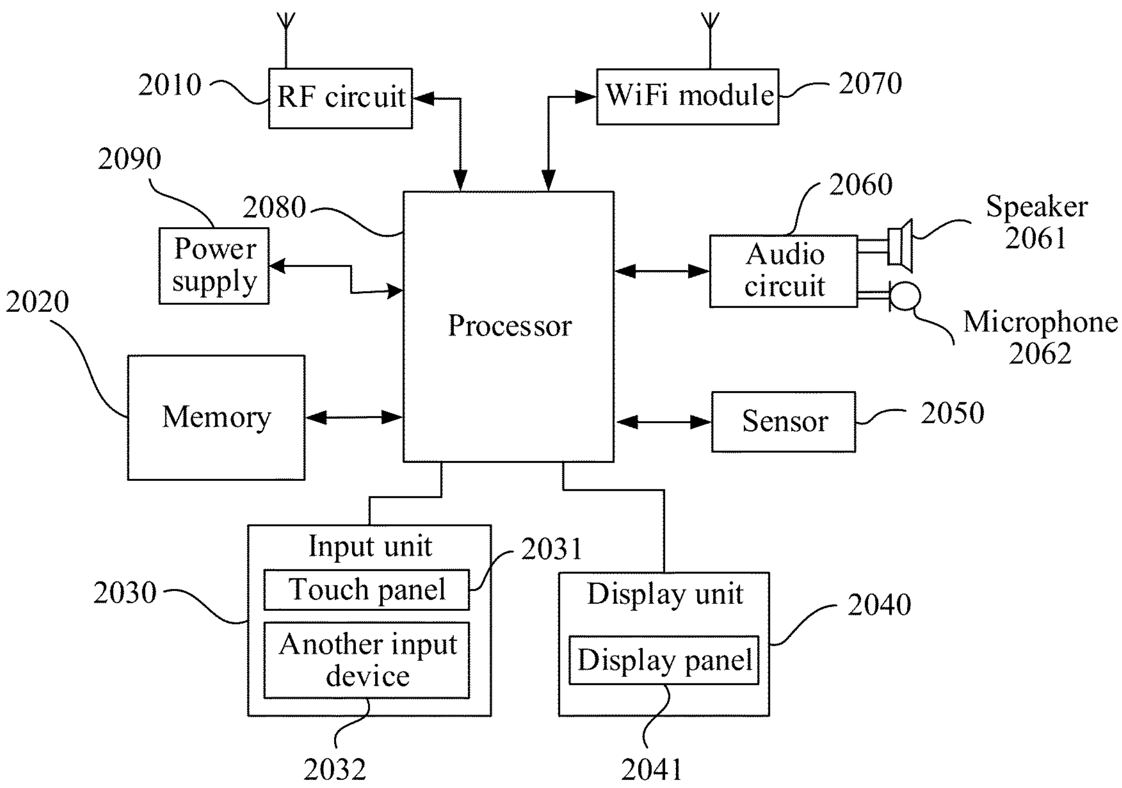
FIG. 20 is a diagram of a terminal according to an embodiment of this application.

FIG. 20 is a block diagram of a part of a smartphone according to an embodiment of this application. Refer to FIG. 20. The smartphone includes components such as a radio frequency (RF) circuit 2010, a memory 2020, an input unit 2030, a display unit 2040, a sensor 2050, an audio circuit 2060, a wireless fidelity (WiFi) module 2070, a processor 2080, and a power supply 2090. The input unit 2030 may include a touch panel 2031 and another input device 2032, the display unit 2040 may include a display panel 2041, and the audio circuit 2060 may include a speaker 2061 and a microphone 2062. It may be understood that the structure of the smartphone shown in FIG. 20 does not constitute a limitation on the smartphone, and the smartphone may include more or fewer components than those shown in the figure, or some components may be combined, or a different component deployment may be used.

Memory 2020 may be configured to store a software program and module. processor 2080 runs the software program and module stored in the memory 2020, to implement various functional applications and data processing of the smartphone. The memory 2020 may mainly include a program storage area and a data storage area. The program storage area may store an operating system, an application program required by at least one function (for example, a sound playing function and an image playing function), and the like. The data storage area may store data (for example, audio data and a phone book) created according to use of the smartphone. In addition, the memory 2020 may include high speed RAM, and may further include a non-volatile memory, such as at least one magnetic disk storage device, a flash memory, or another volatile solid storage device.

The processor 2080 is a control center of the smartphone, and is connected to various parts of the entire smartphone by using various interfaces and lines. By running or executing the software program and/or the module stored in memory 2020, and invoking data stored in the memory 2020, the processor executes various functions of the smartphone and processes the data. In some embodiments, processor 2080 may include one or more processing units. In one example, processor 2080 may integrate an application processor and a modem processor. The application processor mainly processes the operating system, a user interface, an application program, and the like. The modem processor mainly processes wireless communication. It may be understood that the modem processor may either not be integrated into the processor 2080.

In this embodiment, the processor 2080 in the smartphone may perform the following steps:

obtaining a to-be-processed image;

performing vectorization based on the to-be-processed image, to obtain an image representation vector of the to-be-processed image;

performing feature mapping on the image representation vector by using a network block included in a feature mapping module in an image classification model, to obtain an image feature of the to-be-processed image;

performing, during obtaining the image feature by using the network block, at a same network layer of the network block, global feature mapping on input content by using the network layer to obtain a global feature, and performing local feature mapping on the input content by using the network layer to obtain a local feature, the input content being obtained based on the image representation vector; performing feature fusion on the global feature and the local feature by using the network layer, to obtain a fused feature corresponding to the network layer; obtaining the image feature based on the fused feature corresponding to the network layer; and performing category prediction by using a classification module in the image classification model based on the image feature, to obtain a classification result of the to-be-processed image.

Figure 21:
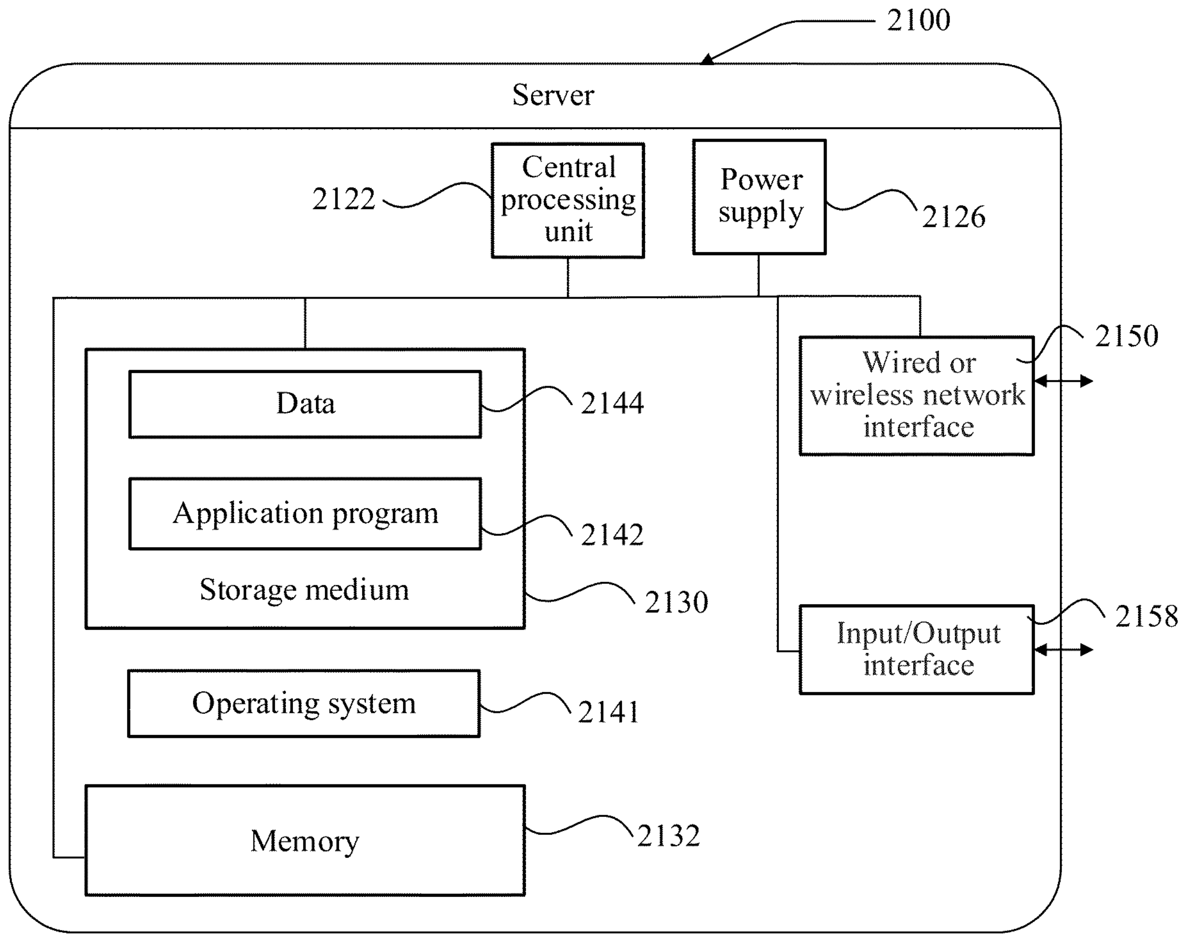
FIG. 21 is a diagram of a server according to an embodiment of this application.

The computer device provided in embodiments consistent with the present disclosure may further be a server. FIG. 21 is a diagram of a server 2100 according to an embodiment of this application. The server 2100 may vary greatly due to different configurations or performance, and may include one or more processors such as central processing units (CPU) 2122 and a memory 2132, and one or more storage mediums 2130 (for example, one or more mass storage devices) that store an application program 2142 or data 2144. The memory 2132 and the storage medium 2130 may be transient or persistent storages. The program stored in the storage medium 2130 may include one or more modules (not marked in the figure), and each module may include a series of instruction operations to the server. Furthermore, the CPU 2122 may be configured to communicate with the storage medium 2130, and perform, on the server 2100, the series of instruction operations in the storage medium 2130.

The server 2100 may further include one or more power supplies 2126, one or more wired or wireless network interfaces 2150, one or more input/output interfaces 2158, and/or one or more operating systems 2141, for example, Windows Server™, Mac OS X™, Unix™, Linux™, and FreeBSD™.

In this embodiment, the CPU 2122 in the server 2100 may perform the following steps:

obtaining a to-be-processed image;

performing vectorization based on the to-be-processed image, to obtain an image representation vector of the to-be-processed image;

performing feature mapping on the image representation vector by using a network block included in a feature mapping module in an image classification model, to obtain an image feature of the to-be-processed image;

performing, during obtaining the image feature by using the network block, at a same network layer of the network block, global feature mapping on input content by using the network layer to obtain a global feature, and performing local feature mapping on the input content by using the network layer to obtain a local feature, the input content being obtained based on the image representation vector; performing feature fusion on the global feature and the local feature by using the network layer, to obtain a fused feature corresponding to the network layer; obtaining the image feature based on the fused feature corresponding to the network layer; and performing category prediction by using a classification module in the image classification model based on the image feature, to obtain a classification result of the to-be-processed image.

According to an aspect of this application, a computer-readable storage medium is provided. The computer-readable storage medium is configured to store program code, and the program code is configured for performing the image processing method according to the foregoing embodiments.

According to an aspect of this application, a computer program product is provided. The computer program product includes a computer program, and the computer program is stored in a computer-readable storage medium. A processor of a computer device reads the computer program from the computer-readable storage medium, and executes the computer program, causing the computer device to perform the methods provided in the various implementations according to the foregoing embodiments.

Description for procedures or structures corresponding to the foregoing accompanying drawings each has its own emphasis, and for a part of a specified procedure or structure that is not described in detail, refer to relevant description of another procedure or structure.

In the specification and the accompanying drawings of this application, the ter"s “fi"st”, “see"nd”, “th"rd”, “fou"th”, and the like (if existing) are intended to distinguish between similar objects rather than describe a specific sequence or a precedence order. It is to be understood that data used in this way is interchangeable in a suitable case, so that the embodiments of this application described herein can, for example, be implemented in an order other than those illustrated or described herein. Furthermore, the ter"s “compr"se”, “h"ve”, and any variants thereof are intended to cover non-exclusive inclusion. For example, a process, a method, a system, a product, or a device that includes a series of steps or units is not necessarily limited to those explicitly listed steps or units, but may include other steps or units not explicitly listed or inherent to the process, the method, the product, or the device.

In the embodiments provided in this application, it is to be understood that the disclosed system, apparatus, and method may be implemented in other manners. For example, the described apparatus embodiments are only exemplary. For example, the division of the units is only a logical function division and may be other divisions during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate. Parts displayed as units may or may not be physical units, and may be located in one position, or may be distributed on a plurality of network units. Some or all of the units may be selected according to an actual requirement to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the technical field, or all or a part of the technical solutions may be implemented in the form of a software product. The computer software product is stored in a storage medium and includes several instructions for instructing a computer device (which may be a computer, a server, or a network device) to perform all or some of the steps of the method described in the embodiments of this application. The foregoing storage medium includes: any medium that can store a computer program, such as a USB flash drive, a removable hard disk, a read-only memory (ROM), a random access memory (RAM), a magnetic disk, or an optical disk.

The foregoing embodiments are merely intended for describing the technical solutions of this application, but not for limiting this application. It is to be understood by a person of ordinary skill in the art that although this application has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the technical solutions of the embodiments of this application.

What is claimed is:

1. An image processing method, performed by a computer device, the method comprising:

performing vectorization on a to-be-processed image, to obtain an image representation vector;

performing feature mapping on the image representation vector by using a network block comprised in a feature mapping module in an image classification model, to obtain an image feature, including: performing, at a same network layer of a network block, global feature mapping on input content by using the network layer to obtain a global feature, and performing local feature mapping on the input content by using the network layer to obtain a local feature, the input content being obtained based on the image representation vector;

performing feature fusion by the network layer by performing weighted summation on target features being fused according to weight values respectively corresponding to the target features, to obtain a fused feature corresponding to the network layer, wherein the target features comprise the global feature and the local feature, and a sum of the weigh values corresponding to the target features is 1;

obtaining an image feature based on the fused feature corresponding to the network layer; and performing category prediction by using a classification module in the image classification model based on the image feature, to obtain a classification result of the to-be-processed image.

2. The method according to claim 1, wherein a weight value in the weight value of the global feature and the weight value of the local feature is 1, and an other weight value is 0.

3. The method according to claim 1, wherein the determining weight values respectively corresponding to the global feature and the local feature comprises:

performing addition based on the global feature and the local feature, to obtain an added feature; and performing probability estimation by using a probability estimation module based on the added feature, to obtain the weight values respectively corresponding to the global feature and the local feature.

4. The method according to claim 1, wherein:

performing the feature mapping further comprises: performing convolutional feature mapping on the image representation vector by using the network layer, to obtain a convolutional feature;

the target features being fused further comprises the convolutional feature; and the weighted summation is performed on the global feature, the local feature, and the convolutional feature by using the network layer, to obtain the fused feature corresponding to the network layer.

5. The method according to claim 1, wherein the feature mapping module comprises a plurality of network blocks, each network block is connected to a down-sampling module, the plurality of network blocks comprises a first network block and a second network block, and the performing feature mapping on the image representation vector by using a network block comprised in a feature mapping module in an image classification model, to obtain an image feature of the to-be-processed image comprises:

performing feature mapping on the image representation vector by using the first network block, to obtain a first feature map of the to-be-processed image;

down-sampling the first feature map by using a down-sampling module connected to the first network block, to obtain a first-scale feature map;

performing feature mapping on the first-scale feature map by using the second network block, to obtain a second feature map of the to-be-processed image;

down-sampling the second feature map by using a down-sampling module connected to the second network block, to obtain a second-scale feature map; and obtaining the image feature of the to-be-processed image based on the second-scale feature map.

6. The method according to claim 1, wherein the performing vectorization based on the to-be-processed image, to obtain an image representation vector of the to-be-processed image comprises:

cropping and dividing the to-be-processed image based on a patch size, to obtain a plurality of image patches;

performing data structure mapping on the plurality of image patches, to obtain one-dimensional structured data of the to-be-processed image; and performing vectorization on the one-dimensional structured data, to obtain the image representation vector.

7. The method according to claim 6, wherein the method further comprises:

obtaining position vectors respectively corresponding to the plurality of image patches; and the performing vectorization on the one-dimensional structured data, to obtain the image representation vector comprises:

performing vectorization on the one-dimensional structured data, to obtain a patch vector corresponding to each image patch; and obtaining the image representation vector based on the patch vector and a position vector that correspond to each image patch.

8. The method according to claim 1, wherein the image classification model further comprises a fully connected layer, and the performing category prediction by using a classification module in the image classification model based on the image feature, to obtain a classification result of the to-be-processed image comprises:

performing fully connected calculation on the image feature by using the fully connected layer, and mapping the image feature into a classification quantity length; and performing category prediction by using the classification module based on the image feature of the classification quantity length, to obtain the classification result.

9. A computer device, comprising a processor and a memory, the memory being configured to store program code and transmit the program code to the processor; and the processor being configured, when executing instructions in the program code, to perform:

performing vectorization on a to-be-processed image, to obtain an image representation vector;

performing feature mapping on the image representation vector by using a network block comprised in a feature mapping module in an image classification model, to obtain an image feature, including: performing, at a same network layer of a network block, global feature mapping on input content by using the network layer to obtain a global feature, and performing local feature mapping on the input content by using the network layer to obtain a local feature, the input content being obtained based on the image representation vector, performing feature fusion by the network layer by performing weighted summation on target features being fused according to weight values respectively corresponding to the target features, to obtain a fused feature corresponding to the network layer, wherein the target features comprise the global feature and the local feature, and a sum of the weigh values corresponding to the target features is 1;

obtaining an image feature based on the fused feature corresponding to the network layer; and performing category prediction by using a classification module in the image classification model based on the image feature, to obtain a classification result of the to-be-processed image.

10. The computer device according to claim 9, wherein a weight value in the weight value of the global feature and the weight value of the local feature is 1, and an other weight value is 0.

11. The computer device according to claim 9, wherein the determining weight values respectively corresponding to the global feature and the local feature comprises:
performing addition based on the global feature and the local feature, to obtain an added feature; and
performing probability estimation by using a probability estimation module based on the added feature, to obtain the weight values respectively corresponding to the global feature and the local feature.

12. The computer device according to claim 9, wherein:
performing the feature mapping further comprises: performing convolutional feature mapping on the image representation vector by using the network layer, to obtain a convolutional feature; and
the target features being fused further comprises the convolutional feature; and
the weighted summation is performed on the global feature, the local feature, and the convolutional feature by using the network layer, to obtain the fused feature corresponding to the network layer.

13. The computer device according to claim 9, wherein the feature mapping module comprises a plurality of network blocks, each network block is connected to a down-sampling module, the plurality of network blocks comprises a first network block and a second network block, and the performing feature mapping on the image representation vector by using a network block comprised in a feature mapping module in an image classification model, to obtain an image feature of the to-be-processed image comprises:
performing feature mapping on the image representation vector by using the first network block, to obtain a first feature map of the to-be-processed image;
down-sampling the first feature map by using a down-sampling module connected to the first network block, to obtain a first-scale feature map;
performing feature mapping on the first-scale feature map by using the second network block, to obtain a second feature map of the to-be-processed image;
down-sampling the second feature map by using a down-sampling module connected to the second network block, to obtain a second-scale feature map; and
obtaining the image feature of the to-be-processed image based on the second-scale feature map.

14. The computer device according to claim 9, wherein the performing vectorization based on the to-be-processed image, to obtain an image representation vector of the to-be-processed image comprises:
cropping and dividing the to-be-processed image based on a patch size, to obtain a plurality of image patches;
performing data structure mapping on the plurality of image patches, to obtain one-dimensional structured data of the to-be-processed image; and
performing vectorization on the one-dimensional structured data, to obtain the image representation vector.

15. The computer device according to claim 14, wherein the processor is further configured to perform:
obtaining position vectors respectively corresponding to the plurality of image patches; and
the performing vectorization on the one-dimensional structured data, to obtain the image representation vector comprises:
performing vectorization on the one-dimensional structured data, to obtain a patch vector corresponding to each image patch; and
obtaining the image representation vector based on the patch vector and a position vector that correspond to each image patch.

16. The computer device according to claim 9, wherein the image classification model further comprises a fully connected layer, and the performing category prediction by using a classification module in the image classification model based on the image feature, to obtain a classification result of the to-be-processed image comprises:
performing fully connected calculation on the image feature by using the fully connected layer, and mapping the image feature into a classification quantity length; and
performing category prediction by using the classification module based on the image feature of the classification quantity length, to obtain the classification result.

17. A non-transitory computer-readable storage medium, configured to store program code, the program code, when executed by a processor, causing the processor to perform:
performing vectorization on a to-be-processed image, to obtain an image representation vector;
performing feature mapping on the image representation vector by using a network block comprised in a feature mapping module in an image classification model, to obtain an image feature, including: performing, at a same network layer of a network block, global feature mapping on input content by using the network layer to obtain a global feature, and performing local feature mapping on the input content by using the network layer to obtain a local feature, the input content being obtained based on the image representation vector;
performing feature fusion by the network layer by performing weighted summation on target features being fused according to weight values respectively corresponding to the target features, to obtain a fused feature corresponding to the network layer, wherein the target features comprise the global feature and the local feature, and a sum of the weigh values corresponding to the target features is 1;
obtaining an image feature based on the fused feature corresponding to the network layer; and
performing category prediction by using a classification module in the image classification model based on the image feature, to obtain a classification result of the to-be-processed image.

18. The non-transitory computer-readable storage medium according to claim 17, wherein the determining weight values respectively corresponding to the global feature and the local feature comprises:
performing addition based on the global feature and the local feature, to obtain an added feature; and
performing probability estimation by using a probability estimation module based on the added feature, to obtain the weight values respectively corresponding to the global feature and the local feature.

19. The non-transitory computer-readable storage medium according to claim 17, wherein:
performing the feature mapping further comprises: performing convolutional feature mapping on the image representation vector by using the network layer, to obtain a convolutional feature;
the target features being fused further comprises the convolutional feature; and
the weighted summation is performed on the global feature, the local feature, and the convolutional feature by using the network layer, to obtain the fused feature corresponding to the network layer.

20. The non-transitory computer-readable storage medium according to claim 17, wherein the performing vectorization based on the to-be-processed image, to obtain an image representation vector of the to-be-processed image comprises:

cropping and dividing the to-be-processed image based on a patch size, to obtain a plurality of image patches;

performing data structure mapping on the plurality of image patches, to obtain one-dimensional structured data of the to-be-processed image; and performing vectorization on the one-dimensional structured data, to obtain the image representation vector.

* * * * *